(12) United States Patent
Chen

(10) Patent No.: US 12,483,411 B1
(45) Date of Patent: Nov. 25, 2025

(54) BLOCKCHAIN-BASED ARTIFICIAL INTELLIGENCE AGENT LIFE CYCLE MANAGEMENT AND AUTHENTICATION SYSTEMS AND METHODS

(71) Applicant: TYNTRE, LLC, Irvine, CA (US)

(72) Inventor: Thomas Chen, Irvine, CA (US)

(73) Assignee: TYNTRE, LLC, Irvine, CA (US)

( * ) Notice: Subject to any disclaimer, the term of this patent is extended or adjusted under 35 U.S.C. 154(b) by 0 days.

(21) Appl. No.: 19/231,175

(22) Filed: Jun. 6, 2025

Related U.S. Application Data

(63) Continuation-in-part of application No. 19/070,298, filed on Mar. 4, 2025, now Pat. No. 12,418,417.

(51) Int. Cl.
   *H04L 9/32* (2006.01)
   *H04L 51/02* (2022.01)

(52) U.S. Cl.
   CPC ............ *H04L 9/3213* (2013.01); *H04L 51/02* (2013.01)

(58) Field of Classification Search
   None
   See application file for complete search history.

(56) References Cited

U.S. PATENT DOCUMENTS

| | | | |
|---|---|---|---|
| 10,904,212 B1* | 1/2021 | Kaizer | H04L 51/52 |
| 2018/0337872 A1* | 11/2018 | Fawcett | G06F 8/31 |
| 2022/0191026 A1* | 6/2022 | Perpetua, Jr. | H04L 9/3239 |
| 2025/0244964 A1* | 7/2025 | Mystetskyi | G06F 8/65 |

OTHER PUBLICATIONS

South, Tobin et al. "Authenticated Delegation and Authorized AI Agents" [online] arxiv.org, Jan. 16, 2025 [retrieved Aug. 22, 2025]. Retrieved form the Internet: URL: https://arxiv.org/pdf/2501.09674 (Year: 2025).*

\* cited by examiner

*Primary Examiner* — Taghi T Arani
*Assistant Examiner* — Joshua Raymond White
(74) *Attorney, Agent, or Firm* — Haynes and Boone, LLP

(57) ABSTRACT

Methods and systems are presented for using blockchain technologies to manage the life cycle and authentication of artificial intelligence (AI) agents. When an AI agent is created, the AI agent registers itself with an authentication system. The authentication system creates identity information for the AI agent and store on a blockchain. The identity information is used to track the changes of the AI agent through its life cycle, including upgrading of the binary code, transfer of ownership, change of a delegator, and others. When the AI agent requests for access of one or more resources, the authentication system uses the information stored on the blockchain to authenticate the AI agent before granting the AI agent access to the one or more resources.

20 Claims, 11 Drawing Sheets

BLOCKCHAIN-BASED ARTIFICIAL INTELLIGENCE AGENT LIFE CYCLE MANAGEMENT AND AUTHENTICATION SYSTEMS AND METHODS

CROSS REFERENCE TO RELATED APPLICATION

The present application is a Continuation in Part of U.S. patent application Ser. No. 19/070,298, filed Mar. 4, 2025, which is hereby incorporated by reference in its entirety as if fully set forth below and for all applicable purposes.

BACKGROUND

The present specification generally relates to computer network security, and more specifically, to providing a blockchain-based framework for facilitating authentication and life-cycle management for artificial intelligence agents according to various embodiments of the disclosure.

RELATED ART

Artificial intelligence agents, commonly known as AI agents or virtual assistants, can be applied to a wide range of practical applications across various industries. In customer service, AI agents can handle user inquiries, provide support, and resolve issues 24/7, improving customer satisfaction and reducing operational costs. In healthcare, AI agents can offer initial consultations, answer health-related questions, and remind patients to take their medications. In the e-commerce sector, AI agents can assist with product recommendations, order tracking, and personalized shopping experiences. In information technology (IT) support, these agents can guide users through troubleshooting steps, helping them resolve software and hardware issues. Specifically, for network hazards, AI agents can diagnose connectivity problems, suggest corrective actions, and provide step-by-step guidance to ensure network security and stability. Their versatility and ability to handle diverse tasks make them valuable tools in enhancing efficiency and user experience in various fields.

AI agents often employ a neural network based generative language model (also referred to as "AI models") to generate an output such as in the form of a text response, or a series actions to complete a complex task, such as to network issue troubleshooting, etc. Such generative language model receives a natural language input in the form of a sequence of tokens, and in turn generates a predicted distribution over a token space conditioned on the input sequence. Generated output tokens over time may in turn form the text response, or actions for completing the task.

Due to the capabilities of AI agents, they are often utilized to perform tasks autonomously or on behalf of users. For example, an AI agent may be instructed by a user to perform payment transactions on behalf of the user using an account of the user. In another example, an AI agent may be instructed by a user to analyze a computer network issue, and implement a plan to resolve the computer network issue. While these AI agents offer tremendous functionalities and convenience for human users, they also bring forth potential computer security risks to computer networks of various organizations. For example, in order for the AI agent to perform the tasks, it may be required that the AI agent access certain resources (e.g., data, functionalities of another computer module, such as another AI agent, etc.). Without proper control and management of these AI agents, they may be utilized by malicious users to gain unauthorized access to these resources. As such, there is a need to provide a framework for managing the life cycle and authentication of AI agents.

Figure 1:
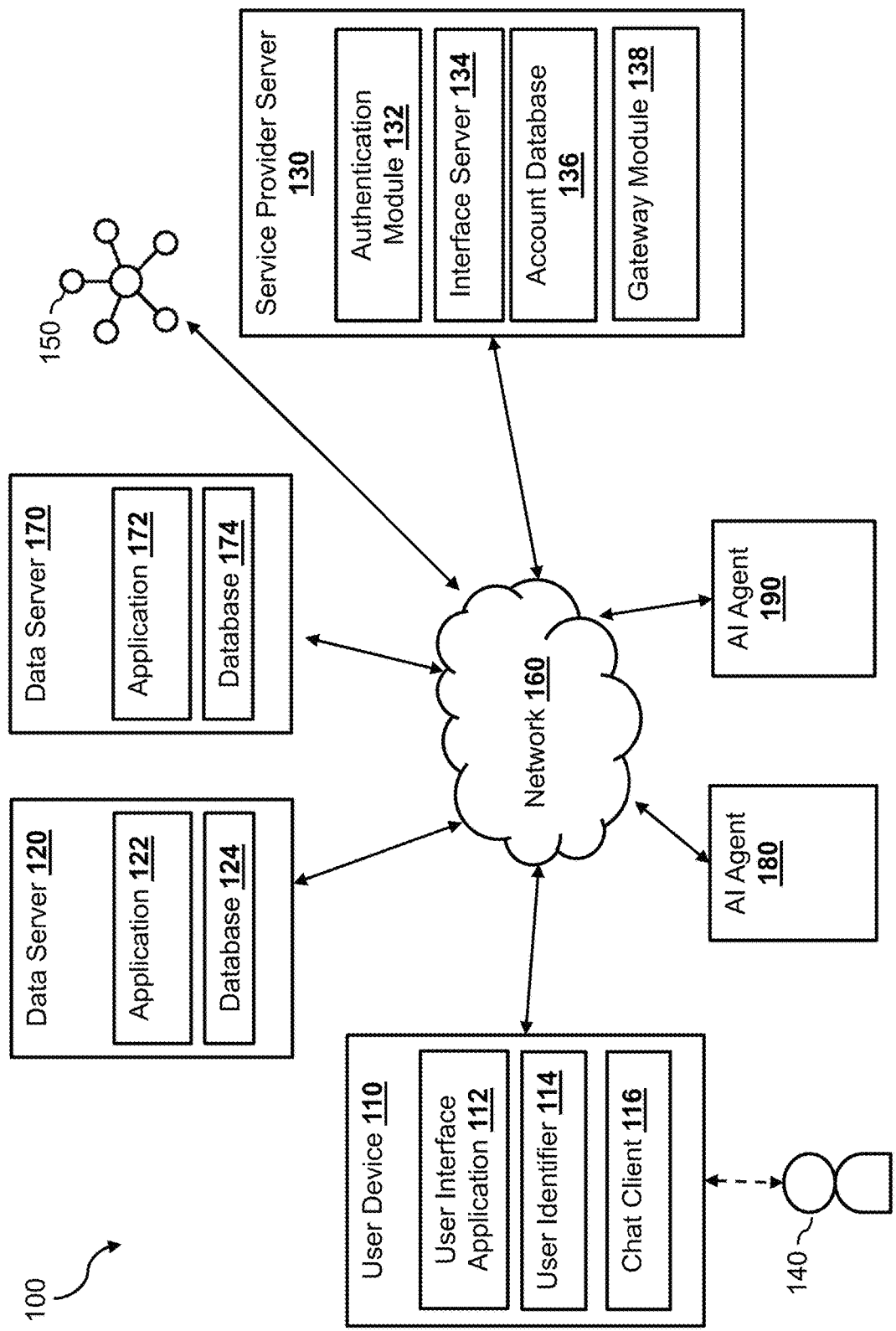
FIG. 1 is a block diagram illustrating a networked system that includes an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for providing a framework that manages the life cycle and authentication of artificial intelligence (AI) agents in various computer network environments. As discussed herein, AI agents can be widely deployed in different computer environments and settings to perform different tasks either autonomously or on behalf of different human users (also referred to as "delegators"). An AI agent may access resources (e.g., data, functionalities associated with another computer module such as another AI agent, etc.) within a computer network (e.g., within an internal private network associated with an organization, within a public network, etc.), perform various processing based on the resources, and generate outputs (e.g., a prediction of a computer network issues, a prediction of a medical diagnosis, etc.). The outputs may be used by the AI agent, a human user that controls the AI agent, and/or another computer module (e.g., another AI agent) for other processes (e.g., implementing a fix for the computer network issue, etc.).

While these AI agents offer tremendous capabilities and convenience for human users, their frequent access to various computer resources can pose significant risks to the computer network where resources are accessed. For example, an AI agent may be developed and used by a malicious delegator (e.g., a malicious human user, etc.) to perform unauthorized tasks within a computer network environment. In another example, an AI agent may be modified by a malicious party different from the delegator (e.g., infected with a computer virus, etc.), such that the AI agent may perform operations apart from the tasks delegated by the delegator (e.g., accessing data, and transmitting the data to an unauthorized external server, etc.).

As such, the framework provides techniques that utilize blockchains to manage the life cycle and authentication of the AI agents, such that any AI agents requesting access to resources would need to be authenticated based on a blockchain-based authentication process before access is granted (or denied) to the AI agents. Under the framework, an authentication system uses a blockchain to track a life cycle for each AI agent (e.g., a model, a version, one or more updates to the version based on modifications to the binary code of the AI agent, tasks and actions performed by the AI agent, etc.), and use the information stored on the blockchain to verify various attributes of the AI agent (e.g., whether the AI agent satisfies a set of requirements for performing the requested task, whether the AI agent has been modified since the last time a record associated with the AI agent has been recorded on the blockchain, delegation relationships associated with the AI agent, etc.) before access to a resource is granted to the AI agent. This way, any action performed by the AI agent and/or action performed to the AI agent is monitored and recorded on the blockchain. Due to the immutability of blockchains, using such a technique to track a life cycle (and other activities) of AI agents and authenticate AI agents based on attributes stored on the blockchain can substantially enhance the computer network security where the AI agents are deployed.

Using the framework disclosed herein, additional functionalities and features may be provided to users (e.g., human users, AI agents, etc.) according to various embodiments of the disclosure. For example, a gateway (which can be implemented as a middle layer between the users/AI agents and other AI models) may be provided to enhance the interactions between the users/AI agents and the other AI models. In some embodiments, based on tracking the life-cycle and activity history of each user and AI agent using the blockchain, the gateway provides customized prompts to other AI models (e.g., other large language models associated with different servers or organizations, etc.) on behalf of the user and/or the AI agent. For example, upon receiving a prompt from a user and/or an AI agent acting on behalf of the user directed to an AI model (e.g., within a chat session, etc.), the gateway may enrich the prompt for the user and/or the AI agent based on the activity history of the user and/or AI agent using the blockchain, and provide the enriched prompt to the AI model. The gateway may determine a topic associated with the prompt, and may retrieve content related to the topic that the user and/or the AI agent has generated and/or received in the past (e.g., responses that the user and/or the AI agent received from the AI model or another AI model in the past, content that the user and/or the AI agent provided in a previous chat session, responses generated by the AI model or another AI model and presented in the previous chat session, etc.). The gateway may generate a summary of the content, and may incorporate the summary into the prompt submitted by the user and/or the AI agent. The enriched prompt (instead of the original prompt) may be provided to the AI model, such that the AI model may generate a response that can take into account the activities associated with the user and/or the AI agent, and related to the topic.

Using the blockchain-based authentication for users and AI agents, roles and access policies may be assigned to the users and AI agents that can be applied across different computer systems (e.g., across different organizations, etc.). In some embodiments, the gateway also performs content filtering functions for the user and/or the AI agent based on the role and/or the access policy associated with the user and/or the AI agent. For example, when the gateway receives the prompt from the user and/or the AI agent, the gateway may access permission data (e.g., which may specify one or more roles and/or an access policy) associated with the user and/or the AI agent on the blockchain, and may modify the prompt from the user and/or the AI agent. Based on the permission data, the gateway may determine whether the prompt requests information or data that is accessible by the user and/or the AI agent. If it is determined that a portion of the information or data requested in the prompt is not accessible by the user and/or the AI agent based on the permission data, the gateway may modify the prompt to eliminate the portion of the prompt that requests the information or data that is not accessible by the user and/or the AI agent.

In some embodiments, the gateway also filter the responses to the user and/or the AI agent based on the permission data. For example, after providing the prompt (or the modified prompt) to the AI model, the AI model may generate a response based on the prompt (or the modified prompt). The gateway may analyze the response and may modify the response before providing the response to the user and/or the AI agent. The gateway may determine whether any portion of the response includes information or data that is not accessible by the user and/or the AI agent based on the permission data.

In some embodiments, each AI agent (that has been delegated tasks by a human user) may in turn instantiate (e.g., spawn) another AI agent (e.g., a child AI agent) to perform some of the delegated tasks or one or more sub-tasks of the delegated tasks. The child AI agent may obtain a unique agent token identifier, and may inherit some of the permission (but not all) from the parent AI agent. Thus, the child AI agent may carry out the tasks delegated by the parent AI agent based on the permission provided to the child AI agent by the parent AI agent, but may not have permissions to perform any other tasks.

FIG. 1 illustrates a networked system 100, within which the framework may be implemented according to one embodiment of the disclosure. Note that the present techniques may be applied in many different computing and technological environments, however, and are not limited to those shown in the figures. The networked system 100 includes a service provider server 130, data servers 120 and 170, a user device 110 associated with a user 140, and AI agents 180 and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

Each of the AI agents 180 and 190 may be implemented as a neural network-based generative language model, such as a large language model (LLM) or a small language model (SLM). An LLM or a SLM is designed to understand and generate human languages. An LLM or a SLM may adopt a Transformer architecture that often entails a significant number of parameters (neural network weights) and computational complexity. For example, LLM such as Generative Pre-trained Transformer (GPT) 3 has 175 billion parameters (while a SLM may have millions of parameters), Text-to-Text Transfer Transformers (T5) has around 11 billion parameters. An LLM or a SLM may comprise an architecture of mixed software and/or hardware, e.g., including an application-specific integrated circuit (ASIC) such as a Tensor Processing Unit (TPU). Each of the AI agents 180 and 190 may be implemented within a device, such as the user device 110 or a computer server communicatively connected to the network 160, such that it is accessible by the user device 110 and/or other devices.

The user device 110, in one embodiment, may be utilized by the user 140 to interact with the data servers 120 and 170, the AI agents 180 and 190, and/or the service provider server 130 over the network 160. For example, the user 140 may use the user device 110 to interact with (or use one of the AI agents 180 or 190 to interact with) one or more of the data servers 120 and/170 (e.g., to register an account with the data servers 120 and 170, to access data stored in the data server 120 and 170, to use one or more functionalities provided by a computer module, such as applications 122 or 172 associated with the data servers 120 and 170, etc.). Additionally, the user 140 may also interact with the service provider server 130 to register an account with the service provider server 130. By registering an account with the service provider server 130, the service provider server 130 of some embodiments may automatically use the credential information (e.g., biometric data, such as facial features, fingerprint, etc. associated with the user 140, password associated with the user 140, device identifier associated with the user 140, etc.) to register the user with the service provider server 130. The user 140 may also register one or more AI agents (e.g., the AI agents 180 and 190, etc.) with the service provider server 130.

The service provider server 130, in one embodiment, may be maintained by a service provider that manages the lifecycle and authentication of various users and AI agents, and managing interactions among various users, AI agents, and AI models. The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130. The interface server 134 may also include other electronic pages associated with the different services (e.g., onboarding services for establishing a human identity within the blockchain 150, onboarding services for establishing an AI agent identity within the blockchain 150, a delegation registration service for registering delegation relationships between users and AI agents, etc.) offered by the service provider server 130. As a result, a user (e.g., the user 140, etc.) and/or an AI agent (e.g., the AI agent 180, the AI agent 190, etc.) may access a user account and access various services offered by the service provider server 130, by generating HTTP requests directed at the service provider server 130.

Under the framework, a human user and/or an AI agent may be assigned a decentralized identity when the human user and/or the AI agent is registered with the service provider server 130. For example, when a human user and/or an AI agent requests to be registered within the framework, an authentication module 132 of the service provider server may generate an identifier (e.g., a randomly generated string or value, a token associated with a blockchain 150, etc.). The identifier may be stored on the blockchain 150 and associated with the human user or the AI agent. When the identifier is generated for a human user, the identifier may be associated through the life of the human user. When the identifier is generated for an AI agent, the identifier may be associated with the AI agent through the life cycle (e.g., from development and deployment, different versions and upgrades, transferring ownership between different users (delegators), until the AI agent is retired or destroyed, etc.).

In addition to the identifiers, the authentication module 132 may also generate an identity token (e.g., minting a token for the blockchain 150, etc.) for the human user or the AI agent. For a human user, the authentication module 132 may link the identity token to the identifier of the user 140 and the credentials (e.g., a biometric signature, multi-factor authentication data, which may include a passcode and a device identifier of a device associated with the user 140, such as the user device 110, etc.). The identity token generated for the user may be stored in a digital wallet of the user 140. The authentication module 132 may store, on the blockchain 150, a record that links the identity token to the user 140 (e.g., the credential information, etc.) and the digital wallet.

For an AI agent, the authentication module 132 may link the identity token to the identifier of the AI agent. The authentication module 132 may also store, on the blockchain 150, a record that links the identity token of the AI agent to various attributes associated with the AI agent, such as an AI agent type (e.g., an autonomous agent, a supervised agent, etc.), task permissions associated with the AI agent (e.g., access to computer network data, access to medical data, access to financial transaction data, role data associated with a role of the AI agent and/or the human delegator of the AI agent, etc.), delegation relationships when the AI agent is a supervised agent (e.g., one or more human users who can delegate task to the AI agent, etc.), a current model version of the AI agent, and instructions for destroying or updating the AI agent when the AI agent is retired. The identity token may be provided to the AI agent, such that the AI agent can use/present it during subsequent authentication processes. In some embodiments, the authentication module 132 may also obtain a hash value of a binary code of the AI agent (or binary code of other AI agent of the same model and version), and link the hash value to the identity token issued for the AI agent.

The hash value may be generated for an AI agent based on different factors, such as model weights (e.g., parameters associated with the AI agent, etc.), a neural network architecture of the AI agent (e.g., the layer structures, the hyper-parameters, etc.), training dataset signature (e.g., training data used to train the AI model), the source code of the AI agent, owner/delegator metadata (e.g., public key signatures of identity metadata of the owner/delegator of the AI agent that is stored on the blockchain 150). In some embodiments, the authentication module 132 may generate a hash value for each of the factors, and then combine them (e.g., append to each other) to generate combined hash, which can be used as a persistent fingerprint of the AI agent in its current configuration.

Whenever attributes of the AI is changed (e.g., upgraded to a new model version, any modification to the binary code, a change of ownership, a change of a delegator, undergo a re-training, re-deployed at another machine, etc.), the AI agent has to re-register itself with the authentication module 132, such that a new identity token (which is linked to the updated version/binary code of the AI agent) can be issued to the AI agent. The linked information for a human user or an AI agent can be stored on the blockchain 150 or a data store that is linked to the blockchain 150. For example, the linked information may be stored in the account database 136. In some embodiments, the service provider server 130 maintains one or more user accounts in an account database 136 and/or a blockchain 150, each of which may be associated with a profile and may include account information associated with one or more individual users (e.g., the user 140 associated with user device 110, the AI agent 180, the AI agent 190, etc.). The account information may include a token (e.g., a human identity token, an agent identity token, etc.) generated by the service provider server 130 and associated with the blockchain 150 (e.g., by minting a token, etc.). In one implementation, a user may also have credentials to authenticate or verify identity with the service provider server 130 and/or a third-party identity verification service such as CLEAR®, OKTAR, IDV®, Incode®, Berify.me®. Thus, the service provider server 130 may store the credentials of the users in corresponding records of the account database 136 and/or the blockchain 150 associated with the user accounts. The credential data associated with each user may include digital copies (e.g., one or more images, etc.) of an identity document (e.g., a driver's license, a passport, etc.) (or an encoded version of the document), biometric data (e.g., a fingerprint, data associated with an image of the user's face, data associated with an image of an iris, etc.), and/or a digital signature. Additional details for integrating third-party identity verification service into the framework as disclosed herein can be found in U.S. patent application Ser. No. 18/742,305, titled "Blockchain-Based Platform-Independent Personal Profiles," filed Jun. 13, 2024, which is incorporated herein by reference in its entirety.

The user 140 may also interact with the AI agents 180 and 190. For example, after registering an AI agent (e.g., the AI agent 180, the AI agent 190, etc.) with the authentication module 132, and specify a delegation relationship with the AI agent, in which case the authentication module 132 may add the delegation relationship between the user 140 and the AI agent into the blockchain as a new transaction record (and update the accounts database 136). The user 140 may then begin using the AI agent to perform various tasks on behalf of the user 140. For example, if the user 140 is an information technology (IT) specialist, the user 140 may use the AI agent to analyze a computer network condition and determine an issue with the computer network. The user 140 may also use the AI agent to generate a solution to fix the computer network issue. Based on the output from the AI agent, the user 140 (or the AI agent automatically) may interact with other computer components within the computer network to implement the fix. In another example, if the user 140 is a medical professional, the user 140 may use the AI agent to analyze heath data (e.g., an X-ray, markers from a blood test, etc.) of a patient and determine a diagnosis of the patient. The user 140 may also use the AI agent to generate a treatment or a prescription for the user 140 based on the diagnosis. When performing any one of these tasks, the AI agent may need to interact with the data server 120 and/or the data server 170 (e.g., to access resources from the data server 120 and/or the data server 170, such as data or functionalities provided by one or more software modules of the data server 120 and/or the data server 170). As such, each of the AI agents 180 and 190 may also interact with the data servers 120 and 170 either autonomously or on behalf of a delegator.

The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile application, etc.), which may be utilized by the user 140 to interact with the data servers 120 and 170, the AI agents 180 and 190, and/or the service provider server 130 over the network 160. In one implementation, the UI application 112 includes a software program (e.g., a mobile application) that provides a graphical user interface (GUI) for the user 140. In another implementation, the UI application 112 includes a browser module that provides a network interface to browse information available over the network 160. For example, the UI application 112 may be implemented, in part, as a web browser to view information available over the network 160.

The user device 110, in one embodiment, may include at least one identifier 114, which may be implemented, for example, as operating system registry entries, cookies associated with the UI application 112, the identifiers associated with hardware of the user device 110 (e.g., a media control access (MAC) address), the identifier and/or the identity token assigned to the user 140 when the user 140 is registered within the framework, or various other appropriate identifiers. In various implementations, the identifier 114 may be passed with a user login request to the service provider server 130 via the network 160, and the identifier 114 may be used by the service provider server 130 to associate the user 140 with a particular user account, a particular digital wallet, and/or a particular profile.

The user device 110 also includes a chat client 116 for facilitating online chat sessions with another chat client (e.g., a chat client of another device, a chat client associated with an AI agent, the gateway module 138 of the service provider server, etc.). The chat client 116 may be a software application executed on the user device 110 for providing a chat client interface for the user 140 and for exchanging (e.g., transmitting and receiving) messages with the other chat client (either via a peer-to-peer chat protocol or via a chat server). For example, during an online chat session with other chat clients, the chat client 116 may present a chat interface that enables the user 140 to input data (e.g., text data such as utterances, audio data, multi-media data, a prompt for an AI agent and/or an AI model, etc.) for transmitting to the other chat clients. The chat interface of the chat client 116 may also present messages that are received from other chat clients (or the AI models). In some embodiments, the messages may be presented on the chat client interface in a chronological order according to a chat flow of the online chat session. As such, some of the messages presented on the chat client 116 may include responses generated by an AI agent (e.g., the AI agent 180, the AI agent 190, etc.) or other AI models connected via the network 160. The chat client 116 may be an embedded application that is embedded within another application, such as the UI application 112. Alternatively, the chat client 116 may be a stand-alone chat client program (e.g., a mobile app such as WhatsApp®, Slack®, Microsoft Team®, Facebook® Messenger, iMessages®, etc.) that is not associated with any other software applications executed on the user device 110.

In various implementations, the user 140 is able to input data and information into an input component (e.g., a keyboard) of the user device 110. For example, the user 140 may use the input component to interact with the UI application 112 (e.g., to retrieve data from third-party servers such as the data servers 120 and 170, to provide instructions, in the form of a prompt, to the AI agents 180 and 190 to instruct the AI agents to perform tasks on behalf of the user 140, etc.).

While only one user device 110 is shown in FIG. 1, it has been contemplated that multiple user devices can be included in the networked system 100. Each of the user devices may include similar hardware and software components as the user device 110 to enable their respective users to interact with the data servers 120 and 10, the AI agents 180 and 190, and/or the service provider server 130.

Each of the data servers 120 and 170 may be associated with a third-party organization, such as a company, a hospital, a medical facility, a government agency that is configured to store data associated with various users and entities. As shown, each of the data servers 120 and 170 may include a database (e.g., databases 124 and 174, respectively) for storing data usable for performing various tasks, such as computer network diagnosis, medical diagnosis, etc. Each of the data servers 120 and 170 may also include one or more computer software modules (e.g., applications 122 and 172, respectively) for performing various functionalities. Each of the applications 122 and 172 may be implemented as a computer program, such as an AI model (e.g., a LLM, a SLM, etc.), a web application, a database application, etc. The functionalities provided by the application 112 and 172 may include accessing data from the database 124 and 174, respectively, analyzing the data, providing results from analyzing the data, etc.

In some embodiments, the user 140, via the UI application 112, may access the data stored in the databases 124 and 174 and/or utilize the functionalities provided by the applications 112 and 172. Additionally or alternatively, the user 140 may instruct the AI agents 180 and 190 to access the data and/or the functionalities of the data servers 120 and 170 on behalf of the user 140. For example, the user 140 may instruct (e.g., through one or more prompts) an AI agent to perform a task (e.g., diagnosing a computer network issue of a computer network, determining a medical condition of a patient, etc.). In order to perform the task, the AI agent may need data (e.g., computer network data, patient health data, etc.) from the databases 124 and/or 174. As such, while performing the task, the AI agent may request access to data stored in the databases 124 and/or 174, or the access to the functionalities provided by the applications 112 and/or 172. In some embodiments, the framework enables the user 140 and/or an AI agent delegated by the user 140, to access the functionalities of the applications 112 and/or 172 via the chat client 116, as disclosed in more detail below.

When the AI agent requests access to any resources from the data server 120 and/or the data server 170, a blockchain-based authentication process may be triggered. In some embodiments, at least part of the blockchain-based authentication process may be implemented as a computer process executed by the authentication module 132 and/or a smart contract associated with the blockchain 150. For example, the authentication module 132 may generate a smart contract that includes executable code associated with the blockchain-based authentication process, and store it in the blockchain 150. When a data server (e.g., the data server 120 and/or the data server 170, etc.) receives a request to access a resource from an AI agent, the data server may access the smart contract on the blockchain 150, and trigger an execution of the smart contract 150. Alternatively, the data server may transmit an authentication request to the authentication module 132, and the authentication module 132 may initiate the blockchain-based authentication process.

The blockchain-based authentication process may begin with requesting the AI agent to provide an identity token and a proof of state. The identity token may be the token issued to the AI agent when the AI agent registered with the authentication module 132. The proof of state may include information that proves the state of the binary code associated with the AI agent. For example, the proof of state may include a hash of the binary code of the AI agent, generated at the time of the authentication process (e.g., computed by the smart contract or the authentication module 132).

The authentication module 132 or the system executing the smart contract may access a record on the blockchain 150 using the identity token provided by the AI agent. The authentication module 132 or the system executing the smart contract may extract the information associated with the AI agent from the record, and compare the information against the proof of state provided by the AI agent. The comparison enables the authentication module 132 or the system executing the smart contract to determine whether the AI agent has been modified (e.g., upgraded, code modified by an entity, etc.) since the last time the AI agent registered with the authentication module 132. Since the AI agent is required to re-register whenever any changes to the code of the AI agent is made, a determination that the AI agent has been modified since the last time it registered with the authentication module 132 may indicate that the AI agent has been compromised (e.g., taken over by a malicious user, infected by a code, such as a virus, etc.). As such, the authentication module 132 or the system executing the smart contract may deny the request to access the resource based on failing to authenticate the AI agent.

On the other hand, if the authentication module 132 or the system executing the smart contract determines that the AI agent has not been modified since the last time it registered with the authentication module 132 based on the comparison, the authentication module 132 or the system executing the smart contract may continue the authentication process for the AI agent. For example, the authentication module 132 or the system executing the smart contract may determine whether the AI agent has permissions to access the resource indicated in the request. The authentication module 132 or the system executing the smart contract may extract the permission information from one or more records from the blockchain based on the identity token provided by the AI agent, and compare the permission information against the resource. The authentication module 132 or the system executing the smart contract may deny access to the resource if it determines that the AI agent has no permission to access the resource based on the permission information.

If it is determined that the AI agent is performing a task on behalf of a human user (e.g., based on the identity token and/or the request, etc.), the authentication module 132 or the system executing the smart contract may request the AI agent to provide a token associated with the human user. For example, when the human user instructs the AI agent to perform a task, the human user may provide the identity token of the human user to the AI agent as part of the prompt (which the AI agent may provide to the authentication module 132 during the authentication process). The authentication module 132 or the system executing the smart contract may access the delegation relationship associated with the AI agent from the information stored on the blockchain 150 based on the token associated with the AI agent. The authentication module 132 or the system executing the smart contract then determines if the human user who delegated the task to the AI agent has an established (e.g., registered) delegation relationship with the AI agent according to the blockchain 150 (e.g., has the relationship been recorded on the blockchain 150). If the human user who delegated the task to the AI agent does not have a registered delegation relationship with the AI agent, the authentication module 132 or the system executing the smart contract may deny the request to access the resource.

On the other hand, if the human user who delegated the task to the AI agent has a registered delegation relationships with the AI agent, the authentication module 132 or the system executing the smart contract may determine whether the task is similar to other tasks that the AI agent has performed on behalf of that human user in the past. For example, since every task (e.g., resource access operation) performed by the AI agent has been recorded on the blockchain 150, the authentication module 132 or the system executing the smart contract may retrieve the information associated with the tasks performed by the AI agent on behalf of the human user in the past from the blockchain 150. The authentication module 132 or the system executing the smart contract may analyze the task information and determine whether the task associated with the request is consistent with the previous task (e.g., whether the task deviates in terms of the type of resources being accessed from the previous tasks). For example, if the previous tasks involve the AI agent accessing funding account information of the human user, the authentication module 132 or the system executing the smart contract may determine that the current task is consistent with the previous tasks if the current task requires access to funding account information of the human user. But the authentication module 132 or the system executing the smart contract may determine that the current task is inconsistent with the previous tasks if the current task requires access to medical information of the human user. In some embodiments, the authentication module 132 or the system executing the smart contract may use a machine learning model to determine a deviation score between the current task and the previous tasks based on attributes of the tasks, and determine to deny the request if the deviation score exceeds a threshold.

In some embodiments, the authentication module 132 or the system executing the smart contract may also determine a trust score for the AI agent based on the tasks previously performed by the AI agent and resources previously requested by the AI agent. For example, all AI agents may be assigned a trust score when the AI agents register with the authentication module 132. The trust score may be stored on the blockchain 150 as a transaction record associated with the corresponding AI agent. Each time the AI agent requests access for a resource, and was granted access to the resource, the authentication module 132 may increase the trust score for the AI agent, and record the updated trust score on the blockchain 150 as a new transaction record. On the other hand, when the AI agent requests resources that deviate from the resources previously accessed by the AI agent, the authentication module 132 may reduce the trust score, and record the updated trust score on the blockchain 150 as a new transaction record. As such, the authentication module 132 or the system executing the smart contract may access the current trust score associated with the AI agent. The authentication module 132 or the system executing the smart contract may deny the request if the trust score is below a threshold.

After granting or denying the request, the authentication module 132 or the system executing the smart contract may create another transaction record associated with the request. The transaction record may indicate the identity of the AI agent, the type of resources being requested, the identity of the delegator (if any), whether the request was granted or denied, and/or other information related to the request. The transaction record may then be stored on the blockchain 150 for use subsequently in authenticating the AI agent.

The authentication module 132 or the system executing the smart contract may also update the trust score associated with the AI agent based on whether the request was granted (e.g., the trust score would be increased) or denied (e.g., the trust score would be denied). The authentication module 132 or the system executing the smart contract may also store the updated trust score on the blockchain 150 as a new transaction record.

As discussed herein, the framework disclosed herein may give rise to different types of use cases. While several example use cases are described herein, the application of the framework can extend beyond the example use cases without departing from the spirit of this disclosure. The following use cases illustrate dynamic and continuous authentication of AI agents while they execute tasks. These examples showcase how the framework ensures security, trust, and real-time access control while preventing misuse.
Use Case 1: AI Agent Managing Financial Transactions (Banking & Payments)

Scenario: A personal AI financial assistant (e.g., an AI-powered robo-advisor) manages a user's bank account, paying bills, transferring money, and making investment decisions.
How Dynamic AI Authentication Works:
Step 1: AI Agent is Tokenized & Authenticated Before Execution When the user creates an AI financial agent, it is issued a unique AI Agent Identity Token (AIT) with specific permissions (e.g., "Allowed to make payments up to $500 per transaction"). The AI agent is linked to the user's Human Identity Token (HIT) for accountability. The bank recognizes AI agents separately from human logins and requires additional verification for transactions.
Step 2: AI Agent Requests Authorization to Act on Behalf of the User When the AI agent attempts to make a payment, it presents both its AIT and the delegation token from the user. The bank (or the service provider server 130) checks if the AI agent's trust score (based on past transactions) is intact. The AI agent's behavioral signature is checked to ensure it is following usual transaction patterns (e.g., payments to known vendors).

The AI agent's behavior profile can be implemented as a behavioral signature. Since AI agent's behavior evolves post-deployment, a runtime-based identity based on execution patterns can be generated. The behavior profile may be based on the AI agent's API call patterns (e.g., logs of the AI's interactions such as "requests EHR data 5× daily," etc.), decision flow similarity-consistency in AI's logic path for the same inputs, and computational footprint-resource usage, execution timing, and query patterns.

Step 3: Continuous Monitoring During Execution

If the AI agent suddenly initiates an unusually large transfer (e.g., $5,000 instead of $500), or making API calls that are not usually made by the AI agent (as specified in the behavioral profile, the smart contract flags it as suspicious behavior. The AI agent is forced to re-authenticate dynamically using: (1) Zero-Knowledge Proofs (ZKP) to confirm it's still linked to the user and/or real-time human validation (e.g., user receives a biometric verification request). If authentication fails, the AI's access token is revoked immediately.

Step 4: Behavioral-Based Access Modification

If the AI Agent consistently shows safe behavior, its trust score improves (e.g., increases), and it can execute subsequent transactions without re-authenticating frequently based on the trust score. If the AI is flagged for repeated suspicious actions, it is automatically downgraded (e.g., reduces trust score), requiring frequent authentication. If it is determined that the AI is compromised (e.g., modified by an attacker) (determined based on the proof of state is different from the stored hash value indicating the state of the AI agent during the previous transaction), its token is revoked, and it must be reissued. This ensures that an AI agent's identity and integrity remain intact throughout its lifecycle. Below is an example of detailed mechanism to address this issue.

TABLE 1

Methods of checking AI Agent's integrity

| Method | What It Checks? | How It Works? |
| --- | --- | --- |
| Binary Hash Verification | Ensures the AI agent's executable code has not been altered. | The system computes a hash (SHA-256, Merkle Tree, etc.) of the AI agent's binaries and compares it with the registered AI Identity Token (AIT). |
| AI Model Hashing | Checks if the AI's trained model has been modified. | AI weights and parameters are hashed and stored on-chain. Each execution checks if the current AI model hash matches the last known hash. |
| Real-Time Behavioral Anomaly Detection | Detects if AI behavior deviates from expected patterns. | If AI starts making unauthorized decisions, it triggers an automated integrity re-check. |
| Attestation from a Secure AI Execution Environment (TEE/SGX) | Verifies that AI code is running in a secure environment. | AI agents execute inside a Trusted Execution Environment (TEE) such as Intel SGX, which can verify code integrity at runtime. |

Initial AI Agent Registration:

When an AI agent is created, a cryptographic hash (e.g., SHA-256, SHA-3, or Blake2) of its binary and model parameters is generated. This hash is stored in the AI Identity Token (AIT). A corresponding signed certificate is issued to verify authenticity.

Pre-Execution Check:

Each time the AI agent is executed, the system (e.g., the authentication module 132, the smart contract, etc.) computes a new hash of the AI agent's binaries and model. The authentication module 132 compares it against the AIT-stored hash. If there is a mismatch, the authentication module 132 flags the AI agent as modified and triggers re-authentication.

Continuous Runtime Integrity Checks:

If an AI agent modifies itself (e.g., through adversarial attacks, tampering, or retraining), its hash will change. If a change is detected, the AI's token (AIT) is revoked. A re-authentication process (admin review or cryptographic attestation) is triggered.

Why This Works? Immutable Hashes ensure that even the smallest code changes of the AI agent are immediately detected. AIT acts as a cryptographic fingerprint, ensuring the AI agent cannot execute if altered.

AI Model Integrity Tracking

AI models can be tampered with, leading to unintended or malicious actions. To prevent this, we store each AI agent's parameters as a cryptographic commitment (Merkle Root) on-chain. It requires each AI agent's execution to verify its model hash against the stored hash.

Implementation: The AI model's weights, hyperparameters, and training data fingerprints are hashed and stored on a blockchain. If an AI agent's model is retrained or altered, it must recompute its model hash, and submit a new AI Identity Token request to the authentication module 132, which ensures that the AI models are not covertly altered post-deployment.

Behavioral Anomaly Detection for AI Modification

Even if the binary integrity is intact, an AI can still behave unpredictably. Thus, AI trust verification extends beyond code integrity to behavioral authentication.

How it Works:

Each AI agent has a behavior profile based on expected API calls (API calls that the AI agent has historically been using, or API calls that AI agents of the same type and/or functionalities have historically been using, etc.), typical input-output patterns (based on the AI Agent's previous behavior or behavior of other AI Agents of the same type), interaction frequency with other systems, etc. If an AI agent suddenly starts executing unauthorized actions, an anomaly score is computed (or reducing the AI agent's trust score). If anomaly score exceeds a threshold (or the trust score is below a threshold), the AIT of the AI agent is temporarily revoked. AI agent must then pass a re-authentication process before executing again, which prevents AI agents from being exploited via adversarial manipulation.

Trusted Execution Environments (TEE) for AI Security

For additional security, AI agents may be required to be executed within a Trusted Execution Environment (TEE) (which is a computer system environment within a computer device that includes a processor and memory that is isolated from other portions of the computer device), such as: Intel SGX (Secure Guard Extensions), Google Confidential Compute, AWS Nitro Enclaves. TEEs ensure that AI software executes in a secure, tamper-proof environment. If AI agent tries to self-modify or execute unapproved instructions, TEE blocks execution and invalidates the AI Identity Token (AIT). TEE prevents runtime modification of AI agent binaries and models.

AI Modification Response Mechanism

If an AI agent fails an integrity check, the system (e.g., the authentication module 132) immediately revokes the AI Identity Token (AIT), logs the integrity failure to the blockchain 150, and requires re-authentication & re-issuance of the token before the AI can execute tasks again. This ensures modified AI agents cannot execute without explicit re-authentication.

Use Case 2: AI Agent Accessing Patient Health Data & Ordering Medications (Healthcare & Telemedicine)

Scenario: A medical AI assistant is granted limited access to a patient's electronic health records (EHRs) to review test results, suggest potential diagnoses, and/or order prescription refills on behalf of a licensed doctor.

How Dynamic AI Authentication Works:

Step 1: AI Agent Registers with a Medical Institution

AI agent is issued a Medical AI Identity Token (AIT), linked to the doctor's HIT. AI is only allowed to access specific patient records based on assigned roles (e.g., "Can view but not modify medical history").

Step 2: AI Agent Requests Data Access

AI agent requests access to a patient's MRI scan results. The hospital's EHR system (which may include an authentication module similar to the authentication module 132 of the service provider server) verifies the AI's token, ensuring that the AIT of the AI agent is active, is linked to the assigned doctor (the delegator), and the task has not exceeded its access scope (e.g., no modification rights).

Step 3: Real-Time Behavioral Authentication

The AI agent's behavior is compared against expected workflows. The expected workflows may be based on roles associated with the delegator, but may also be determined using a machine learning model based on past decisions, real-time behavioral monitoring, and blockchain-backed auditing. This ensures AI agent operates within safe, ethical, and predictable boundaries. The system (e.g., the authentication module 132) determines expected workflows using a combination of role-based access control (RBAC), historical workflow analysis, and AI-specific behavioral modeling. Below is a breakdown of how this is achieved.

1. Role-Based Access Control (RBAC) for AI Agent Workflow Definitions

Since AI agents are designed to act within predefined roles (e.g., assisting doctors), expected workflows are directly tied to the roles and permissions assigned to both the AI agent and the human user (doctor, nurse, administrator, etc.).

How Expected Workflows are Defined:

The doctor's role (e.g., the delegator, such as a surgeon, a general practitioner, etc.) determines which AI agent functions are authorized. The AI agent is issued a Delegated Task Token (DTT) that only permits actions within the scope of the doctor's role. The system rejects unauthorized actions outside the assigned workflow.

Example: A doctor's AI assistant can access medical imaging results but cannot modify EHR records without explicit approval. If the AI agent suddenly tries to prescribe medication without a doctor's authorization, it triggers an anomaly alert.

Workflow Definition Through Pre-Trained AI Models

Beyond role-based permissions, expected workflows are also defined using historical data and predefined medical protocols.

How it Works:

Pre-Trained AI Models are built using: clinical guidelines (e.g., WHO, FDA, HL7 FHIR standards), institutional protocols (hospital workflow data), previous doctor-AI interactions (machine learning on past decisions), etc.

Real-Time Workflow Matching:

Every request made by an AI agent is compared to historically validated workflows. If an action performed by the AI agent deviates significantly (e.g., exceeding a threshold), it is flagged as an anomaly. The system may transmit an alert to a device of the delegator or owner (e.g., the doctor or administrator, etc.) for approval.

Example: If an AI agent specialized in radiology normally flags suspicious scans for review, but suddenly tries to approve a diagnosis on its own, the system flags this as a deviation. The doctor must explicitly approve the AI agent's new behavior before it proceeds.

Behavioral Monitoring & AI Trust Score

Since AI models learn and evolve, they must be continuously monitored to ensure they stay within expected workflows.

How this Works:

AI agents are assigned trust scores based on historical accuracy, safety, and compliance. If the AI starts behaving outside expected parameters, its trust score decreases. If the trust score drops below a threshold, the system requires the AI agent to be re-authenticated before the AI agent is allowed to continue with performing tasks (e.g., accessing additional resources, etc.). In some embodiments, the system may abort the AI agent's current task if the trust score is too low (e.g., drops below another threshold).

Example: A low-risk AI agent that only schedules patient follow-ups has a high trust score. A diagnostic AI suggesting unapproved treatments will be flagged for trust score reduction and additional verification.

Smart Contracts & Blockchain for Workflow Auditing

To prevent AI from bypassing workflow restrictions, all AI actions are recorded in a tamper-proof blockchain ledger.

How this Works:

Each AI agent logs every action (e.g., retrieving patient data, requesting tests) to the blockchain 150. If an AI agent attempts unauthorized actions, its token is revoked automatically. A hospital administrator can audit all AI agent activities for compliance.

Example: A hospital uses Hyperledger Fabric or Ethereum smart contracts to record who authorized which AI actions. If an AI agent tries to modify patient records without logging an approval, its authentication is immediately revoked. If it suddenly tries to order medications it wasn't programmed for, or access unauthorized patient data, its authentication is also revoked. The AI agent is forced to re-authenticate with the delegator or owner (e.g., the doctor, etc.), and the delegator must manually approve via credentials, such as a biometric scan.

Adaptive AI Access Control

If the AI agent correctly follows medical protocol, its trust score improves, allowing smoother interactions. However, if the AI agent's behavior diverges significantly from historical norms (e.g., ordering high-risk drugs without proper review), the action may trigger immediate lockdown of the AI agent's access by the authentication module 132. The AI agent must be re-certified before continuing.

Use Case 3: Multi-Agent AI Collaboration for Enterprise Security (Cybersecurity & Network Access)

Scenario: A cybersecurity AI manages access control for a company's internal networks. It collaborates with multiple AI agents to monitor for intrusions, authenticate employees attempting remote access, and issue temporary access credentials for external contractors.

How Dynamic AI Authentication Works:

Step 1: AI Agent Requests Access on Behalf of a User

An IT support AI agent requests remote access to the company's network for an external contractor. The AI agent's identity token (AIT) is verified to ensure that it is an approved IT agent, and it has delegated permission from the security team.

Step 2: AI Agents Authenticate Each Other

The IT AI agent communicates with a Network Security AI agent. Before granting access, the Network Security AI agent requires the IT AI agent to prove its legitimacy using a blockchain-based trust ledger (e.g., the blockchain 150) to ensure that the IT AI agent is in good standing). The real-time agent verification (e.g., verifying the proof of state of the IT AI agent) also ensures the IT AI agent has not been modified since the last time the IT AI agent was authenticated.

Step 3: Continuous Risk-Based Authentication

The Network Security AI agent monitors the IT AI agent's activity. If the IT AI only grants access to approved users, no further checks are needed. If the IT AI agent tries to grant access to an unrecognized external contractor, it must re-authenticate with the authentication module 132 dynamically using a real-time blockchain identity check, and provide a zero-knowledge proof showing that the contractor has valid permissions. If the authentication fails, the IT AI agent's access is revoked immediately.

Step 4: AI Agent Trust Level Adjustments

If the IT AI agent continuously follows security best practices, it can issue access without frequent verification. However, if the AI shows risky behavior, the authentication module 132 may require stricter authentication steps before granting access to the IT AI agent, and may disable the IT AI agent entirely if it is determined that the IT AI agent has been comprised (e.g., the code of the IT AI agent has been modified).

Figure 2:
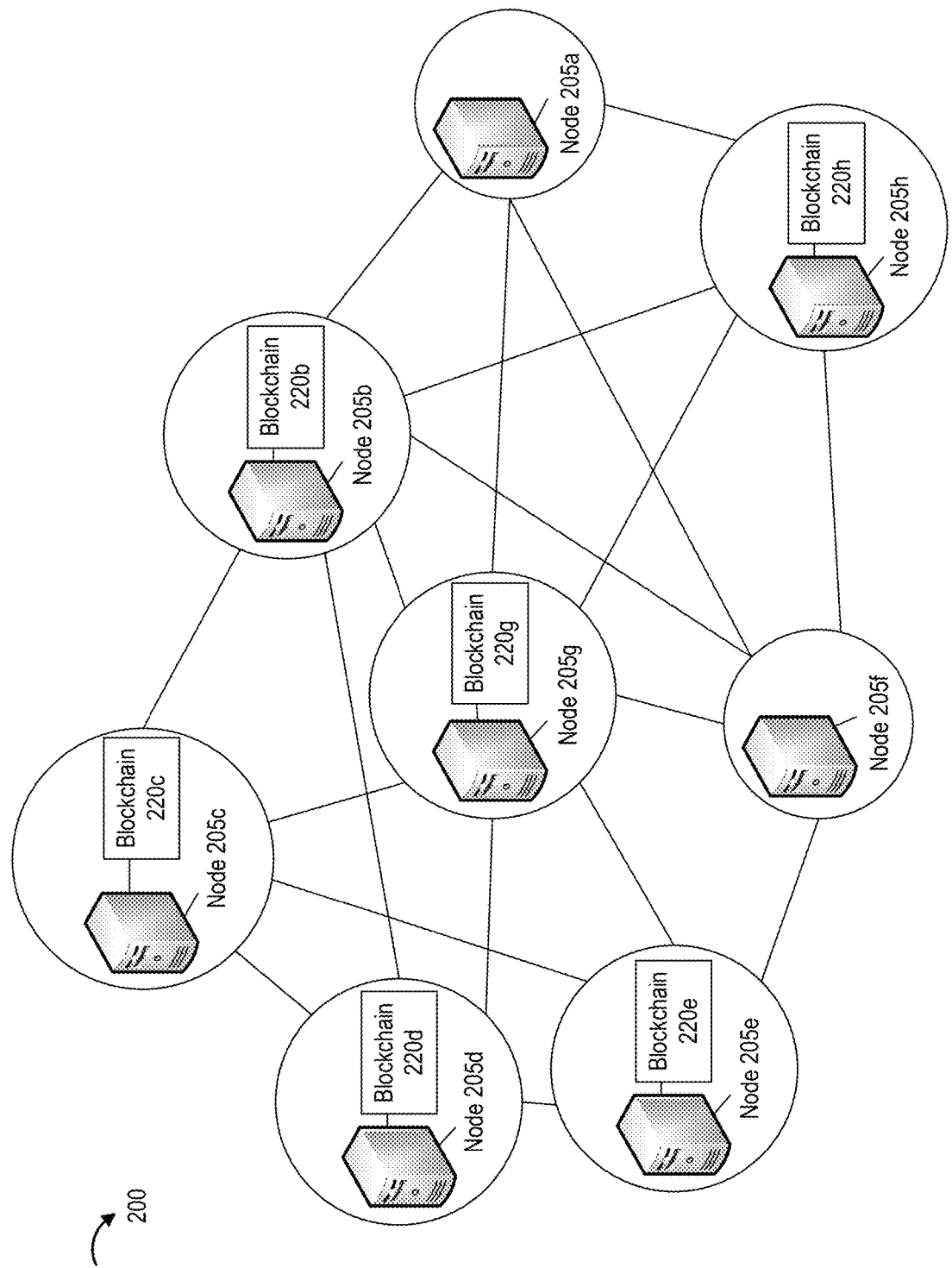
FIG. 2 illustrates an example blockchain network according to an embodiment of the present disclosure.

FIG. 2 shows an example blockchain network 200 comprising a plurality of interconnected nodes or devices 205a-h (generally referred to as nodes 205). Each of the nodes 205 may comprise a computing device 1000 described in more detail with reference to FIG. 10. In some embodiments, each of the nodes may correspond to a server that is designated to access and/or maintain the personal profiles of users according to various embodiments of the disclosure. For example, the service provider server 130 may be one of the nodes 205. In addition, each of the servers (e.g., the data servers 120 and 170) may also be nodes 205 as part of the blockchain network 200. The blockchain network 200 may be associated with a blockchain 220, which may correspond to the blockchain 150. Some or all of the nodes 205 may replicate and save an identical copy of the blockchain 220. For example, FIG. 2 shows that the nodes 205b-e and 205g-h store copies of the blockchain 220. The nodes 205b-e and 205g-h may independently update their respective copies of the blockchain 220 as discussed below.

Figure 3:
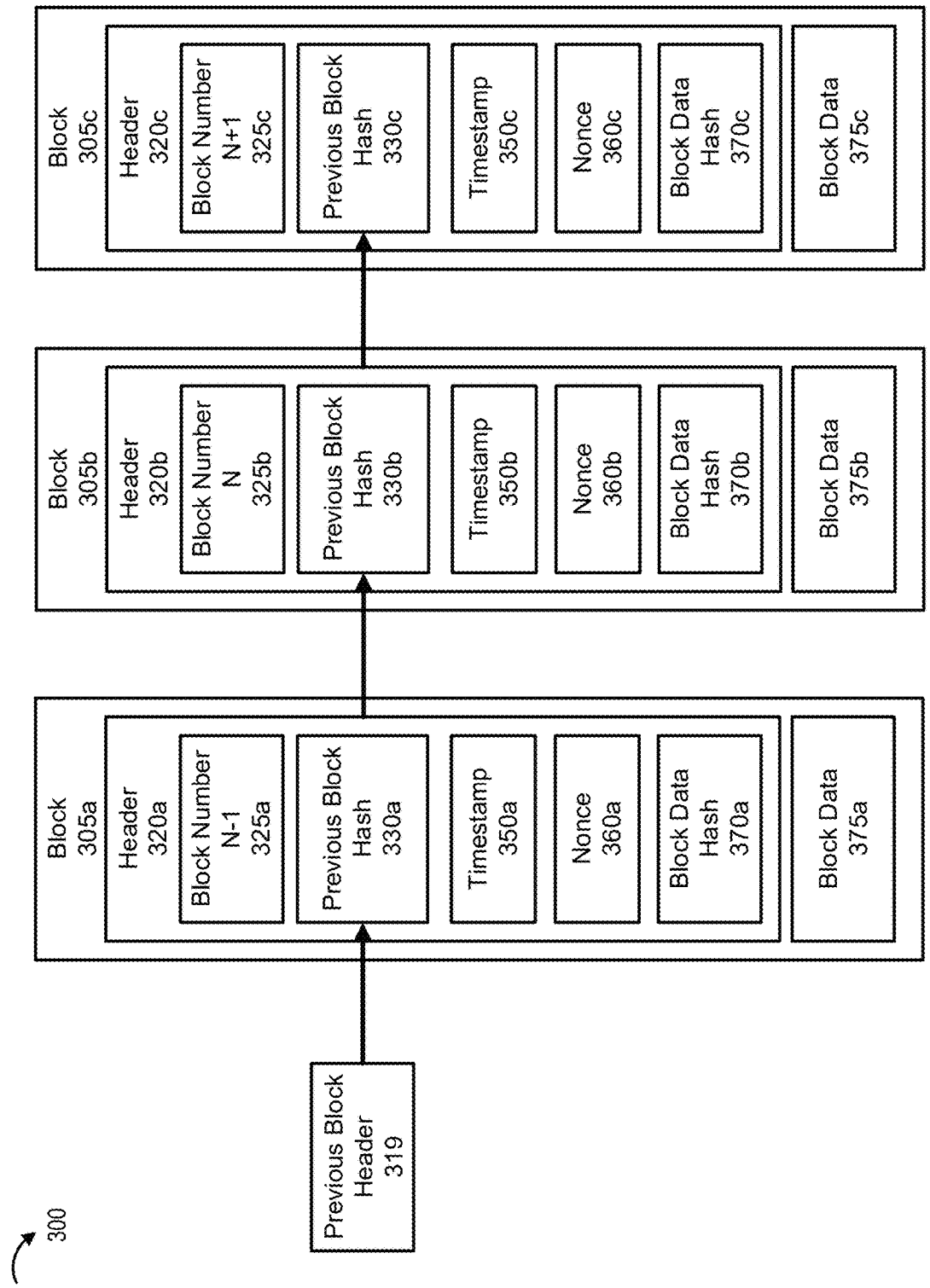
FIG. 3 illustrates an example blockchain according to an embodiment of the present disclosure.

FIG. 3 shows an example blockchain 300. The blockchain 300 may comprise a plurality of blocks 305a, 305b, and 305c (generally referred to as blocks 305). The blockchain 300 comprises a first block (not shown), sometimes referred to as the genesis block. Each of the blocks 305 may comprise a record of one or a plurality of submitted and validated transactions. Each of the blocks 305 may comprise one or more data fields. The organization of the blocks 305 within the blockchain 300 and the corresponding data fields may be implementation specific. As an example, the blocks 305 may comprise a respective header 320a, 320b, and 320c (generally referred to as headers 320) and block data 375a, 375b, and 375c (generally referred to as block data 375). The headers 320 may comprise metadata associated with their respective blocks 305. For example, the headers 320 may comprise a respective block number 325a, 325b, and 325c. As shown in FIG. 3, the block number 325a of the block 305a is N−1, the block number 325b of the block 305b is N, and the block number 325c of the block 305c is N+1. The headers 320 of the blocks 305 may include a data field comprising a block size (not shown).

The blocks 305 may be linked together and cryptographically secured. For example, the header 330a of the block N−1 includes a data field (previous block hash 330a) comprising a hash representation of the previous block corresponding to a previous block header 319, the header 320b of the block N (block 305b) includes a data field (previous block hash 330b) comprising a hash representation of the previous block N−1's header 320a. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320c of the block N+1 (block 305c) includes a data field (previous block hash 330c) comprising a hash representation of block N's (block 305b) header 320b.

The headers 320 of the blocks 305 may also include data fields comprising a hash representation of the block data, such as the block data hash 370a-c. The block data hash 370a-c may be generated, for example, by a Merkle tree and by storing the hash or by using a hash that is based on all of the block data. The headers 320 of the blocks 305 may comprise a respective nonce 360a, 360b, and 360c. In some implementations, the value of the nonce 360a-c is an arbitrary string that is concatenated with (or appended to) the hash of the block. The headers 320 may comprise other data, such as a difficulty target.

The blocks 305 may comprise a respective block data 375a, 375b, and 375c (generally referred to as block data 375). The block data 375 may comprise a record of validated transactions that have also been integrated into the blockchain 200 via a consensus model (described below). As discussed above, the block data 375 may include a variety of different types of data in addition to validated transactions. Block data 375 may include any data, such as text, audio, video, image, or file, that may be represented digitally and stored electronically.

Figure 4:
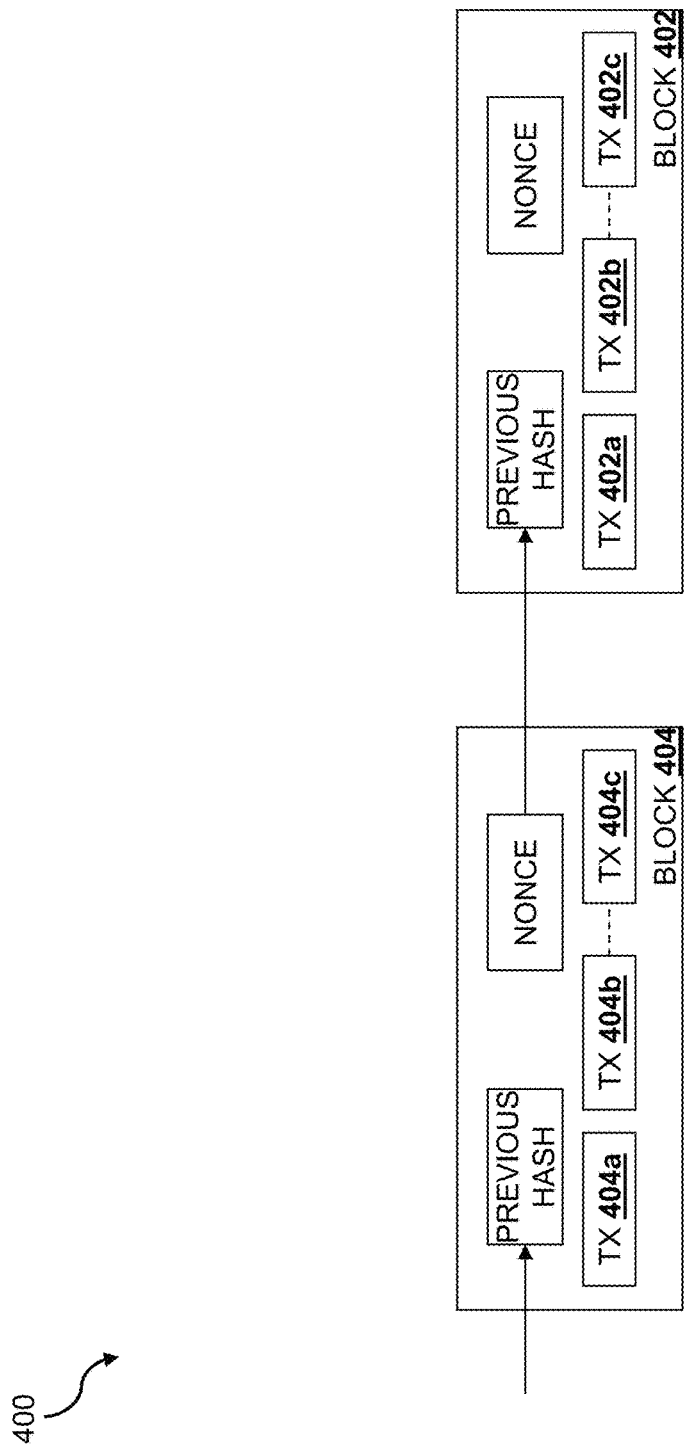
FIG. 4 is a schematic view illustrating a token transaction ledger according to an embodiment of the present disclosure.

FIG. 4 illustrates an example ledger 400 according to one embodiment of the disclosure. The ledger 400 may correspond to a blockchain that is maintained and managed by a network (comprising a network of computer nodes 205 as shown in FIG. 2). When a record is processed by any one of the computer nodes (e.g., the server 120 adding an interaction or transaction of a user to the blockchain 150, etc.), the record is stored in a block that is added to the ledger 400 by the computer node. To produce the ledger 400, a single device (e.g., the service provider server 130, the server 120, etc.) or a distributed network of devices may operate to agree on a single history of records. Each device in the distributed network operates to collect new records into a block, and then to increment a proof-of work system that includes determining a value that when hashed with the block provides a required number of zero bits.

For example, for a block 402 that includes a plurality of records 402a, 402b, and up to 402c, a device in the distributed network may increment a nonce in the block 402 until a value is found that gives a hash of the block 402 the required number of zero bits. The device may then "chain" the block 402 to the previous block 404 (which may have been "chained" to a previous block, not illustrated, in the same manner).

Figure 5:
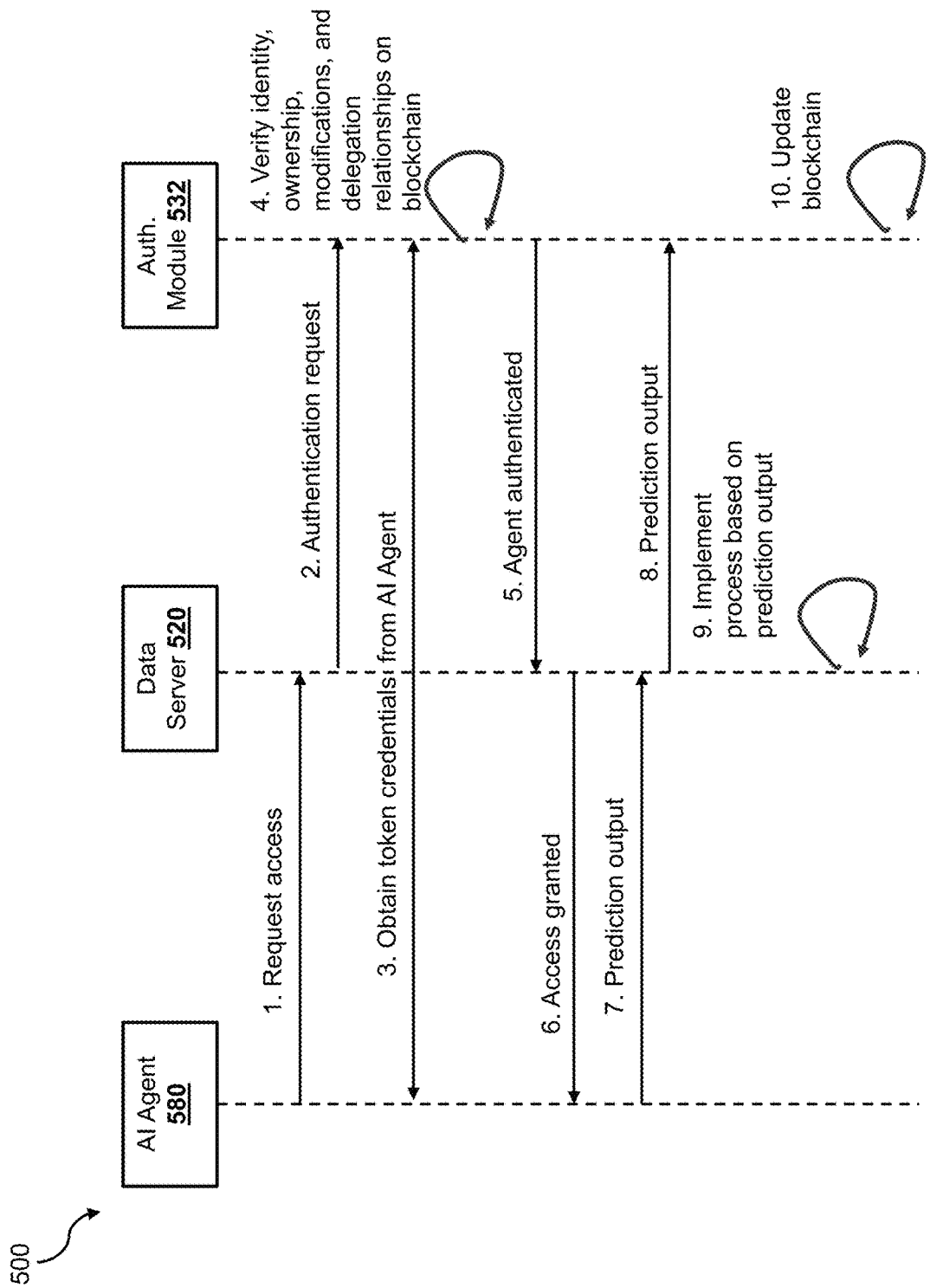
FIG. 5 is swim lane diagram illustrating example interactions among multiple devices for authenticating an AI agent e according to an embodiment of the present disclosure.

FIG. 5 is a swim lane diagram showing a data flow 500 among different computer systems for authenticating an AI agent. In this example, an AI agent 580 requests to access one or more resources from a data server 520. The AI agent 580 may submit a request to the data server 520 for accessing the one or more resources. The submission of the request may trigger the blockchain-based authentication process as disclosed herein. For example, the data server 520 may submit an authentication request to an authentication module 532, which may correspond to the authentication module 132. The authentication module 532 may establish a connection with the AI agent 580 to perform the authentication process. Via the connection, the authentication module 532 may request the AI agent 580 to provide credentials, including an identity token associated with the AI agent 580, a proof of state (e.g., a hash of the binary code associated with the AI agent 580, etc.), the one or more resources being requested, an identity token of a delegator, and other information. The authentication module 532 may retrieve one or more records from the blockchain 150 based on the identity token of the AI agent 580. The authentication module 532 may use the information from the blockchain records to verify attributes of the AI agent 580. For example, the authentication module 532 may determine whether the binary code of the AI agent 580 has been modified since the last time the AI agent 580 was authenticated with the authentication module 532, whether a trust score of the AI agent 580 exceeds a threshold, whether a valid delegation relationship exists between the AI agent 580 and the delegator associated with the identity token, whether the delegator (and the AI agent 580) has permissions to access the one or more resources, etc. Based on the verification, the authentication module 532 may determine whether to authenticate the AI agent or not 580. For example, if it is determined that the binary code of the AI agent 580 has been modified, the trust score is below the threshold, no valid delegation relationship between the AI agent 580 and the delegator, or the delegator and/or the AI agent 580 has no permissions to access the one or more resources, the authentication module 532 may not authenticate the AI agent 580.

On the other hand, if it is determined that the binary code of the AI agent 580 has not been modified, the trust score is above the threshold, a valid delegation relationship exists between the AI agent 580 and the delegator, and the delegator and/or the AI agent 580 has permissions to access the one or more resources, the authentication module 532 may authenticate the AI agent 580. In this example, the authentication module 532 may authenticate the AI agent 580, and transmit a notification to the data server 520. The data server 520 may then grant the AI agent 580 access to the one or more resources. The AI agent 580 may use the one or more resources to perform a task (e.g., generate a prediction output), and provide the prediction output to the data server 520. In some embodiments, the AI agent 580 and/or the data server 520 may implement one or more computer processes based on the prediction output. The authentication module 532 may update the blockchain 150 based on the result. For example, the authentication module 532 may update the trust score (e.g., increasing the trust score) and store a record of the updated trust score on the blockchain 150. The authentication module 532 may also record the resources being accessed and the task performed by the AI agent 580 on the blockchain 150.

Figure 6:
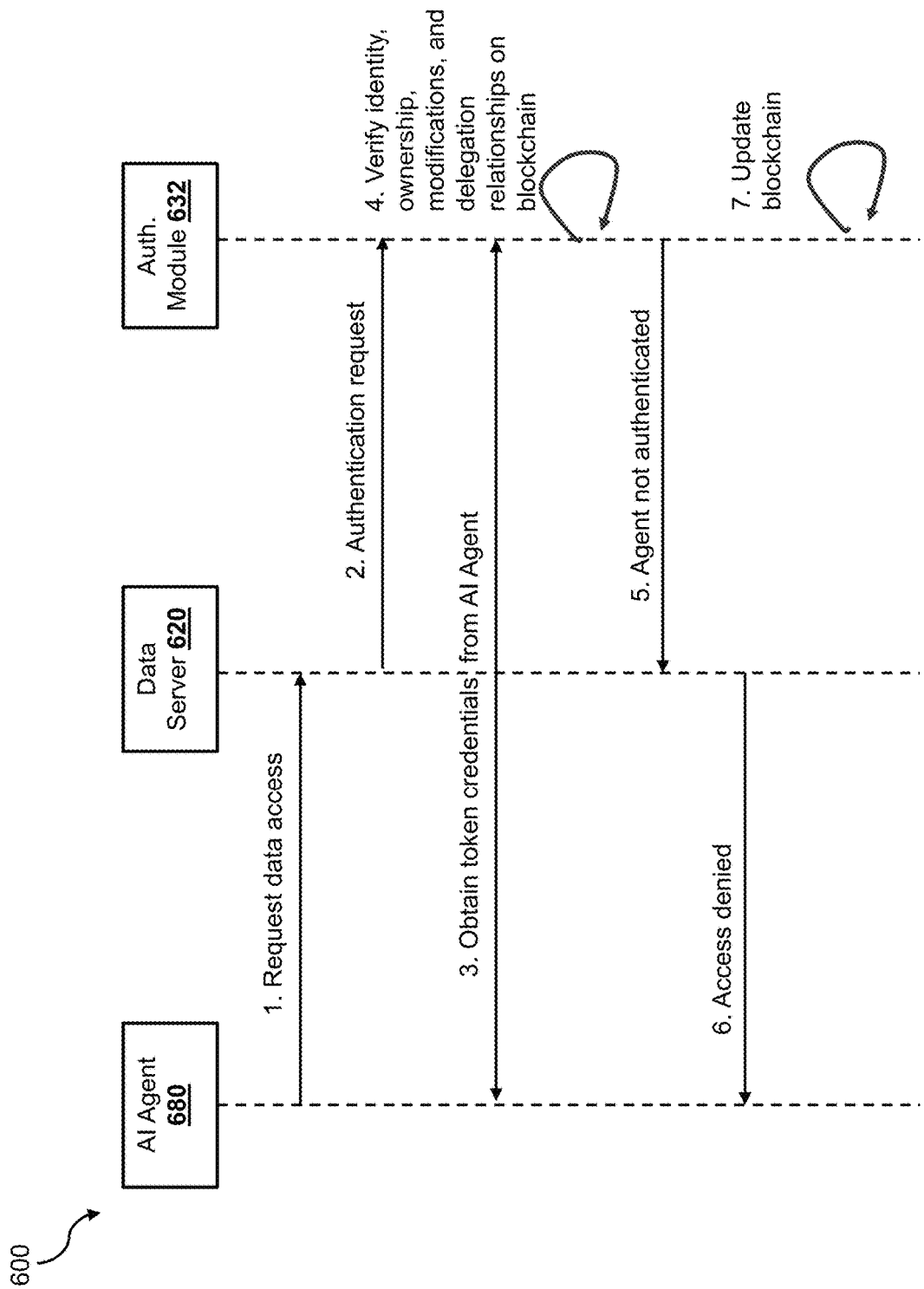
FIG. 6 is swim lane diagram illustrating example interactions among multiple devices for authenticating an AI agent e according to an embodiment of the present disclosure.

FIG. 6 is a swim lane diagram showing another data flow 600 among different computer systems for authenticating an AI agent. Steps 1-4 of the data flow 600 is similar to the steps 1-4 of the data flow 500 of FIG. 5. Specifically, an AI agent 680 submits a request to the data server 620 for accessing one or more resources. The submission of the request may trigger the blockchain-based authentication process as disclosed herein. The data server 620 may submit an authentication request to an authentication module 632, which may correspond to the authentication module 132. The authentication module 632 may establish a connection with the AI agent 680 to perform the authentication process. Via the connection, the authentication module 632 may request the AI agent 680 to provide credentials, including an identity token associated with the AI agent 680, a proof of state (e.g., a hash of the binary code associated with the AI agent 680, etc.), the one or more resources being requested, an identity token of a delegator, and other information. The authentication module 632 may retrieve one or more records from the blockchain 150 based on the identity token of the AI agent 680. The authentication module 632 may use the information from the blockchain records to verify attributes of the AI agent 680.

Unlike the data flow 500, in this example, the authentication module 632 does not authenticate the AI agent 680, possibly due to a determination that the binary code of the AI agent 680 has been modified, the trust score of the AI agent 680 is below the threshold, no valid delegation relationship between the AI agent 680 and the delegator, or the delegator and/or the AI agent 680 has no permissions to access the one or more resources. The authentication module 632 may transmit a notification of authentication denied to the data server 620. The data server 620 may then deny the AI agent 680 access to the one or more resources. Based on the result, the authentication module 632 may update the blockchain 150. For example, the authentication module 632 may update the trust score (by reducing the trust score of the AI agent 680) and store a record of the updated trust score on the blockchain 150.

Figure 7:
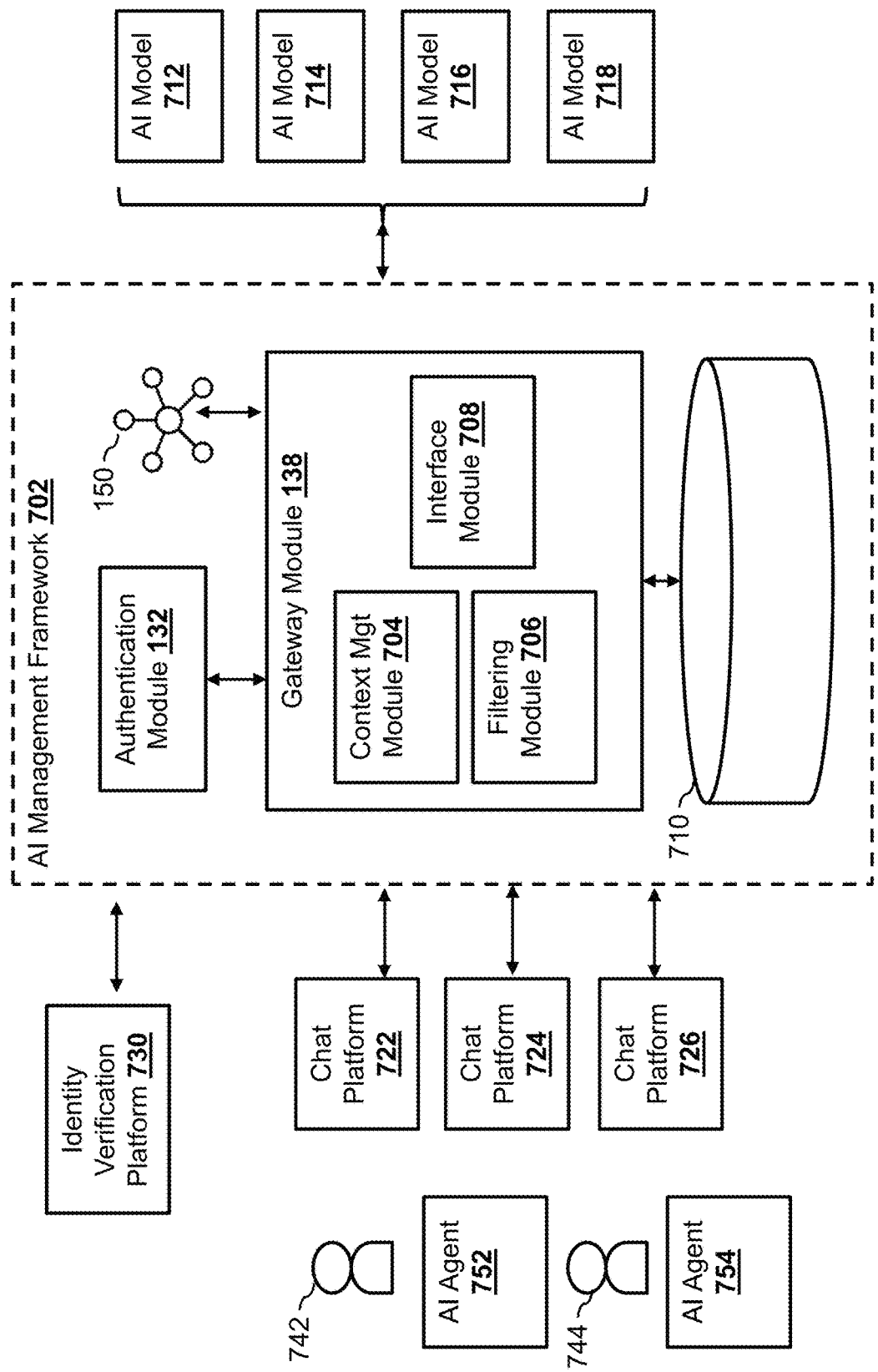
FIG. 7 illustrates an AI management framework according to an embodiment of the present disclosure.

FIG. 7 is a block diagram of an AI management framework 702 according to various embodiments of the disclosure. As shown in FIG. 7, the AI management framework 702 includes the authentication module 132, and gateway module 138, and a data storage 710. In some embodiments, the data storage 710 may correspond to the accounts database 136 of the service provider server 130 in FIG. 1. The gateway module 138 includes a context management module 704, a filtering module 706, and an interface module 708. As discussed herein, various human users (e.g., users 742, 744, etc.) may (or use various AI agents, such as AI agents 752, 754, etc., to) interact with one or more AI models (e.g., AI models 712, 714, 716, and 718, etc.) to perform various tasks. In some embodiments, the AI management framework 702 may use the techniques described herein to provide enhanced services and functionalities for facilitating the interactions between the human users 742 and 744 (and/or the AI agents 752 and 754) and the various AI models 712, 714, 716, and 718.

The AI models 712, 714, 716, and 718 may be associated with the same or different organizations. For example, one or more of the AI models 712, 714, 716, and 718 may be associated with the data server 120, and one or more of the AI models 712, 714, 716, and 718 may be associated with the data server 170. Each of the users 742 and 744 may be associated with an AI agent, and may delegate tasks to the AI agent. For example, the user 742 and the AI agent 752 may be linked via a delegation relationship, and the user 744 and the AI agent 754 may be linked via another delegation relationship. The delegation relationships may be recorded on the blockchain 150 and/or in the data storage 710 in response to the users 742 and 744 registering the delegation relationship with the service provider server 130, using the techniques disclosed herein.

The users 742 and 744 may be associated with the same organization (e.g., the organization associated with a data server, such as the data server 120, etc.). The users 742 and 744 may also collaborate in one or more projects within the organization, and may use one or more of chat platforms 722, 724, and 726 to communicate with each other. During the collaboration, the users 742 and 744 may (or may use the corresponding AI agents) to interact with other AI models, such as the AI models 712, 714, 716, and 718 to perform different tasks associated with the project. The collaboration for the project may last a period of time (e.g., several days, several weeks, several months, etc.). As such, the users 742 and 744 and/or the AI agents 752 and 754 may participate in one or more chat sessions during the collaboration.

When the users 742 and 752 engages with the AI management framework 702 (e.g., initiating or joining a chat session via one or more of the chat platforms 722, 724, and 726, etc.), the AI management framework 702 may use the authentication module 132 to authenticate (e.g., verify an identity, etc.) of the users 742 and 752 using the techniques disclosed herein. In some embodiments, the authentication module 132 may use one or more identity verification platforms (e.g., an identity verification platform 730, etc.) to verify the identities of the users 742 and 752. The identity verification platform 730 may be associated with a third-party platform such as CLEAR®, OKTAR, IDVR, Incode®, Berify.me®. Once the identities of the users 742 and 752 are verified, the authentication module 132 may associate the corresponding human identity tokens to the users (or the user devices used by the users 742 and 744) such that any activities performed by the users 742 and 744 will be associated with the corresponding human identity tokens.

Similarly, when the AI agent 752 and 754 engages with the AI management framework 702 (e.g., initiating or joining a chat session via one or more of the chat platforms 722, 724, and 726, etc.), the AI management framework 702 may use the authentication module 132 to authenticate the AI agents 752 and 754 using the techniques disclosed herein. Once they are authenticated, the authentication module 132 may associate the corresponding agent identity tokens to the AI agents 752 and 754 such that any activities performed by the AI agents 752 and 754 will be associated with the corresponding agent identity tokens.

As the users 742 and 744 and/or the AI agents 752 and 754 participate in the chat session, content may be generated within the chat session. For example, one of the users 742 and 744 and/or the AI agents 752 and 754 may provide content on a chat client of a device (e.g., the chat client 116 of the user device 110), which will be then transmitted to other chat clients associated with the other users and/or AI agents. The content may be in the form of a question, a fact, an opinion, a proposal, one or more instructions, etc. One or more of the AI models 712, 714, 716, and 718 may also generate content during the chat session. For example, if one of the users 742 and 744 and/or the AI agents 752 and 754 submit a prompt to one of the AI models 712, 714, 716, and 718, the AI model may generate content based on the prompt and provide the content in the chat session (e.g., transmitted to the chat clients, etc.).

In some embodiments, the context management module 704 of the gateway module 138 may tag each content generated by a user and/or an AI agent with the identity token (e.g., a human identity token, an agent identity token, etc.) associated with the user and/or the AI agent. The context management module 704 may store the tagged content in the data storage 710. In some embodiments, the content management module 704 may also determine if the content provided by the user and/or the AI agent is related to a particular domain (or topic). For example, when the users 742 and 744 and/or the AI agents 752 and 754 are collaborating in a project, the content management module 704 may determine whether the content being provided during the chat session is related to the project, and may also add an additional tag associated with the domain (or topic). The content management module 704 may use an AI model to generate embeddings based on the content and may determine that the content is related to a particular domain (or topic) when the embeddings of the content and embeddings associated with the domain have a similarity level within a threshold. By storing the tagged contents as a content pool in the data storage 710, the tagged contents may persist across multiple chat sessions, that can be used by the gateway module 138 to provide enhanced services and functionalities to the users 742 and 744 and/or the AI agents 752 and 754.

By tagging content with tokens associated with the content generator (or requestor), the gateway module 138 may trace the contributor of any content stored in the data storage 710 (e.g., during an audit), which enables the gateway module 138 to determine weight for each content (e.g., veracity based on the contributor), reconcile conflicting content by different contributors, reduce contamination of the content pool, and other functions. In some embodiments, the gateway module 138 may generate a visual dashboard that displays a tracking of various contributions (e.g., contents, etc.) by different participants that lead to an outcome associated with the domain (e.g., an action associated with a project, such as an action to buy, an action to sell, an action to negotiate, etc.).

In some embodiments, each output generated by an AI model may be tagged with multiple tokens, such as the agent identity token (AIT) associated with the AI agent that requested the content (e.g., the AI agent that submitted the prompt, etc.), AIT(s) associated with other AI agents that delegate the task to the requesting AI agent, a human identity token associated with a human user that delegates the task to the AI agent, invocation metadata (e.g., identity of the AI model that was used to generate the output, a prompt context hash, a time associated with the generation of the output, a session quorum, such as the identities of the participants in the chat session, etc.). Since the output of the AI model may be used to make decision (e.g., forks, key decisions within a project, etc.), the gateway module 138 may use the tags to derive the decision making process of those decisions (e.g., who made the decision, what was the underlying information used to make the decision, etc.).

In some embodiments, the gateway module 138 may reject a decision based on various factors, such as when a required quorum is not met, a contributor to the decision (e.g., a human contributor, an AI agent contributor, etc.) was flagged after making the decision (e.g., the identity token being revoked, certain permission associated with the identity token being revoked, etc.), a chain of logic for making the decision does not meet explainability constraints, etc. The gateway module 138 may cause an abortion of the implementation of the decision by sending instructions to one or more computer modules that are associated with the decision.

In order to further reduce the possibility of contamination of the content pool, the gateway module 138 of some embodiments may restrict storing of certain contents based on one or more factors, such as an identity of the content creator. In some embodiments, based on the identity tokens (e.g., human identity tokens, agent identity tokens, etc.) of the users 742 and 744 and/or the AI agents 752 and 754, the gateway module 138 may determine which user(s) and/or AI agent(s) have permission to add content to the content pool for a particular domain (or topic). As such, only the contents generated and provided by the user(s) and/or AI agent(s) that have permission to add content to the content pool will be tagged and added to the data storage 710.

As discussed herein, the users 742 and 744 and/or the AI agents 752 and 754 may interact with one or more of the AI models 712, 714, 716, and 718 during one or more chat sessions. For example, one or more of the users 742 and 744 and/or the AI agents 752 and 754 may submit a prompt directed to one of the AI models 712, 714, 716, and 718 within a chat session. In some embodiments, the gateway module 138 act as a gateway between the participants in the chat session and the AI models 712, 714, 716, and 718. Upon receiving the prompt, the gateway module 138 may use the contents from the content pool stored in the data storage 710 to enrich the prompt before providing the enriched prompt to the AI models 712, 714, 716, and 718. For example, the content management module 704 may determine a particular domain (or topic) associated with the prompt and/or the conversation conducted among the participants during the chat session. The content management module 704 may determine the particular domain based on embeddings generated based on the prompt and/or the conversation (e.g., message exchanges during the chat session, etc.). The content management module 704 may then retrieve contents from the data storage 710 that have been tagged with the particular domain. The contents retrieved from the data storage 710 may include contents provided during the current chat session and/or contents provided during any one of the previous chat sessions. Furthermore, even though the prompt submitted during the chat session is directed to a particular AI model (e.g., the AI model 712), the contents retrieved from the data storage 710 may include one or more contents that were generated by one or more other AI models (e.g., the AI models 714, 716, and 718) during the same or previous chat sessions. The content management module 704 may summarize the contents that were retrieved from the data storage 710, and incorporate the summary into the prompt, before providing the enriched prompt to the AI model 712. By including a summary of the contents (generated from the same and/or previous chat sessions) in the prompt, the AI model 712 can take into account information that have been discussed and contributed by the participants of the project when generating new content based on the prompt. As a result, the new content generated by the AI model 712 is more relevant to the prompt and to the domain associated with the prompt. For example, the new content may be more comprehensive and more personalized than a response generated by the AI model 712 based solely on the prompt without the summary. Furthermore, since the contents retrieved from the data storage 710 may include knowledge from the participants (or participants of the previous chat sessions related to the domain), the AI model may inherit the knowledge expressed in the past by the participants (e.g., members of a team or an organization) to generate the new content (e.g., the response) for the prompt.

The interface module 708 may provide the enriched prompt to one or more of the AI models 712, 714, 716, and 718. In some embodiments, the interface module 708 provides the enriched prompt to the AI model specified by the submitter of the prompt. The interface module 708 may then receive new content generated by the AI model (e.g., the AI model 712, etc.). In some embodiments, the interface module 708 provides the enriched prompt to all of the AI models 712, 714, 716, and 718, and receive multiple new contents from the AI models. The gateway module 138 may compare the contents generated by the different AI models, and select one of the contents using one or more criteria (e.g., accuracy, consistency, etc.). In some embodiments, the gateway module 138 uses a particular algorithm (e.g., Best Matching (BM) 25 model, etc.) for ranking the contents.

The content management module 704 may provide the new content generated by the AI model 712 in the chat session (e.g., transmitted to the chat clients associated with the participants, etc.). The content management module 704 may also tag the new content generated by the AI model 712 and store it in the data storage 710, such that the new content can be used by the gateway module 138 to enrich subsequent prompts related to the same domain.

In some embodiments, the gateway module 138 may also provide customized routing to different AI models based on the token (e.g., human identity token, agent identity token, etc.) associated with the requestor. For example, as the gateway module 138 receives a prompt submitted by an AI agent (e.g., the AI agent 752, etc.). The gateway module 138 may derive characteristics associated with the AI agent 752 based on the agent identity token (AIT) associated with the AI agent 752. For example, the gateway module 138 may determine a purpose-of-use (e.g., research, diagnostic, operation review, etc.), content restriction, and sensitive threshold (e.g., a hallucination tolerance, an explainability level, etc.) of the AI agent 752. Based on the characteristics, the gateway module 138 may route the prompt (or the enriched prompt) to a specific AI model that matches the characteristics. For example, if the AI agent 752 has a higher hallucination tolerance, the gateway module 138 may route the prompt to an AI model that has a higher entropy (e.g., more creative). In another example, if the role of the AI agent 752 is on research and/or diagnostic, the gateway module 138 may route the prompt to an AI model that has a higher regulated factual output.

In yet another example, if the prompt submitted by the AI agent 752 is associated with a task delegated by a human user (e.g., the user 742), the gateway module 138 may analyze the AIT associated with the AI agent 752 and the human identity token (HIT) associated with the user 742. If it is determined that the user 742 is a clinical researcher (based on the role associated with the HIT, etc.), and that the AI agent 752's task is for diagnostic support, the gateway module 138 may route the prompt to only AI models that are FDA-cleared.

Based on the AIT of the AI agent 752, the gateway module 138 may provide a customized execution plan for the AI agent 752. For example, if the AI agent 752 has a higher requirement of accuracy, the gateway module 138 may submit the prompt to multiple AI models, and have the different AI models cross check the answer of the AI models.

In some embodiments, the filtering module 706 is configured to modify the prompt submitted by the users 742 and 744 and/or the AI agents 752 and 754 and the responses generated by any one of the AI models 712, 714, 716, and 718. For example, when an entity participates in the chat session, the gateway module 138 may access permission data associated with the entity from the blockchain 150 based on a token (e.g., a human identity token, an agent identity token, etc.). When the entity submitted a prompt directed to an AI model in the chat session, the filtering module 706 may modify the prompt based on the permission data associated with the entity. For example, the filtering module 706 may analyze the data that is being requested in the prompt. If the filtering module 706 determines that a portion of the data being requested in the prompt is not accessible by the entity based on the permission data from the blockchain 150, the filtering module 706 may modify the prompt, for example, by removing a portion of the prompt that is associated with the inaccessible data. In another example, when the prompt includes instructions for instructing one or more AI models to perform one or more actions, if the filtering module 706 determines that some of the actions are not accessible by the entity, the filtering module 706 may modify the prompt to remove the portion of the instructions related to the inaccessible actions. In some embodiments, the gateway module 138 may provide a response to the entity in the chat session, notifying the entity that the action is not accessible by the entity. The interface moule 708 may provide the modified prompt to one or more of the AI models 712, 714, 716, and 718.

When the interface module 708 receives a content (e.g., a response) from an AI model for the chat session, the filtering module 706 may again analyze the content and may modify the content if the filtering module 706 determines that the content includes data that is not accessible by the entity (or other participants in the chat session) based on the permission data from the blockchain 150. For example, the filtering module 706 may remove the portion of the content that is not accessible by the entity (or other participants in the chat session) before providing the modified content to the chat session.

In some embodiments, as the participants of a domain (e.g., a topic, etc.) within one or more chat sessions provide comments to the domain, the content management module 704 may use various techniques to analyze the comments and derive sentiments toward the domain. For example, when discussing about the domain, the participants may provide comments related to how they feel about the domain or certain content associated with the domain. The content management module 704 may analyze the content to derive sentiments related to the domain or topic. In some embodiments, the gateway module 138 may also access third-party content platforms (e.g., video hosting platforms, social media platforms, etc.) to identify contents that are related to the domain. The content management module 704 may analyze comments made to the contents, and incorporate the sentiments associated with the comments to the sentiment analysis to the domain. The gateway module 138 may then present the sentiment analysis in the chat session. Techniques of analyzing sentiments and presentations of the sentiments can be found in U.S. patent application Ser. No. 17/871,244, titled "Visualization Tool for Analyzing Unstructured Comments," filed Jul. 22, 2022, which is incorporated herein by reference in its entirety.

Based on the use of the identity tokens (e.g., human identity tokens, agent identity tokens, etc.), the gateway module 138 may further tag the comments and/or sentiments to one or more particular entities, such that the presentation of the sentiment analysis (e.g., a 3-dimensional sentiment artwork, etc.) may optionally include the identities of the contributors. For example, the gateway module 138 may present an interactable 3-dimensional sentiment artwork based on the sentiments associated with a domain, using the techniques disclosed in U.S. patent application Ser. No. 17/871,244 as discussed above. The gateway module 138 of some embodiments may display presentations of the identities of the contributors associated with different sentiments (and the source comments to lead to the different sentiments) in the 3-dimensional sentiment artwork, for example, when a viewer of the presentation selects one or more of the sentiments. This enables the viewer to interact with the presentation of the sentiment analysis to understand how different sentiments are derived for any particular domain.

Figure 8:
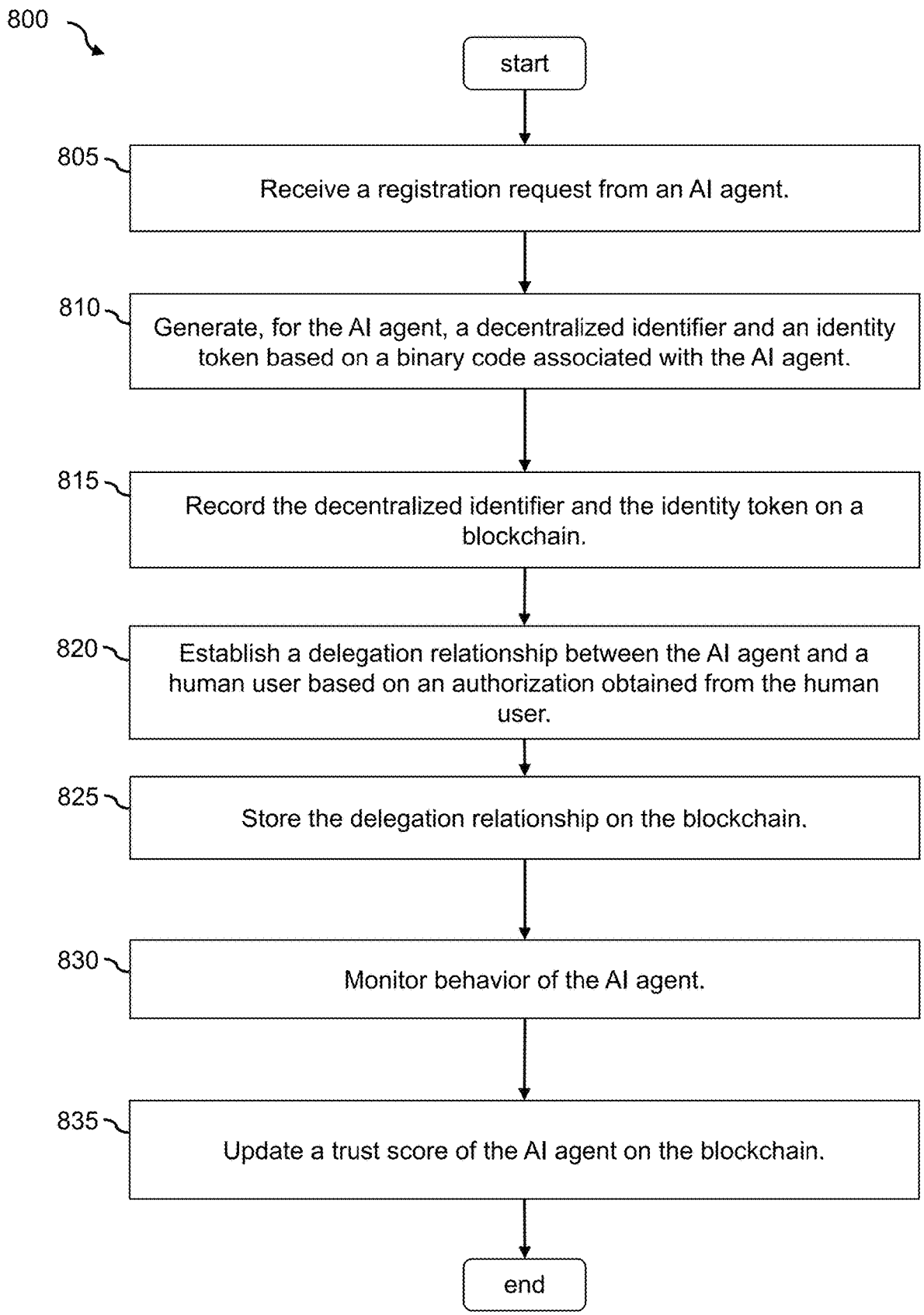
FIG. 8 illustrates a process of registering an AI agent according to an embodiment of the present disclosure.

FIG. 8 illustrates a process 800 for registering an AI agent according to various embodiments of the disclosure. In some embodiments, at least a portion of the process 700 may be performed by the authentication module 132, although one or more steps may be performed by one or more of the components/devices/modules/systems described herein. The process 700 begins by receiving (at step 805) a registration request from an AI agent. For example, when an AI agent (e.g., the AI agent 180, the AI agent, 190, etc.) is created and deployed, the owner or the creator of the AI agent may instruct the AI agent to submit a registration request to the authentication module 132 of the service provider server 130.

Upon receiving the registration request, the authentication module 132 generates (at step 810), for the AI agent, a decentralized identifier and an identity token based on a binary code associated with the AI agent. For example, the authentication module 132 may generate a unique identifier for the AI agent. The unique identifier may be associated with the AI agent for the duration of the life cycle (e.g., until the AI agent is retired or destroyed, etc.). The authentication module 132 may also mint a token associated with the blockchain 150 for the AI agent. Unlike the unique identifier, the token is associated with the AI agent only in its current state. As such, the token is tied (e.g., associated with) to the current model version of the AI agent, the current owner of the AI agent, the current delegator of the AI agent, etc. Whenever a change to the AI agent (e.g., a change to the binary code such as an upgrade to a different version, a change to the ownership, a change of the roles assigned to AI agent, a change of the delegator, etc.), the AI agent is required to re-register with the authentication module 132 to obtain a new token. The authentication module 132 also records (at step 815) the decentralized identifier and the identity token on the blockchain 150.

When it is intended for the AI agent to perform tasks on behalf of a human user, the AI agent and the human user may submit a request to establish a delegation relationship between the AI agent and the human user. The authentication module 132 may request an authorization (e.g., credentials) from the human user, and may establish (at step 820) a delegation relationship between the AI agent and the human user based on the authorization obtained from the human user. The authentication module 132 stores (at step 825) the delegation relationship in the blockchain 150. In some embodiments, the authentication module 132 may also link the identity token to the delegation relationship.

After registering the AI agent and deploying the AI agent, the authentication module 132 monitors (at step 830) the behavior of the AI agent. For example, the authentication module 132 monitors resources being accessed by the AI agent and tasks being performed by the AI agent. The authentication module 132 may generate a behavior profile for the AI agent based on the resources previously accessed by the AI agent and the task performed by the AI agent. The behavior profile represents a norm for the AI agent, including the types of resources frequently accessed by the AI agent and the types of tasks frequently performed by the AI agent. When the AI agent continues to access resources and perform tasks that are consistent to the behavior profile, the authentication module 132 may increase a trust score associated with the AI agent. On the other hand, if the AI agent behaves in a way that deviates from the norm by a threshold, the authentication module 132 may reduce the trust score associated with the AI agent. The authentication module 132 then updates (at step 835) a trust score of the AI agent on the blockchain 150.

Figure 9:
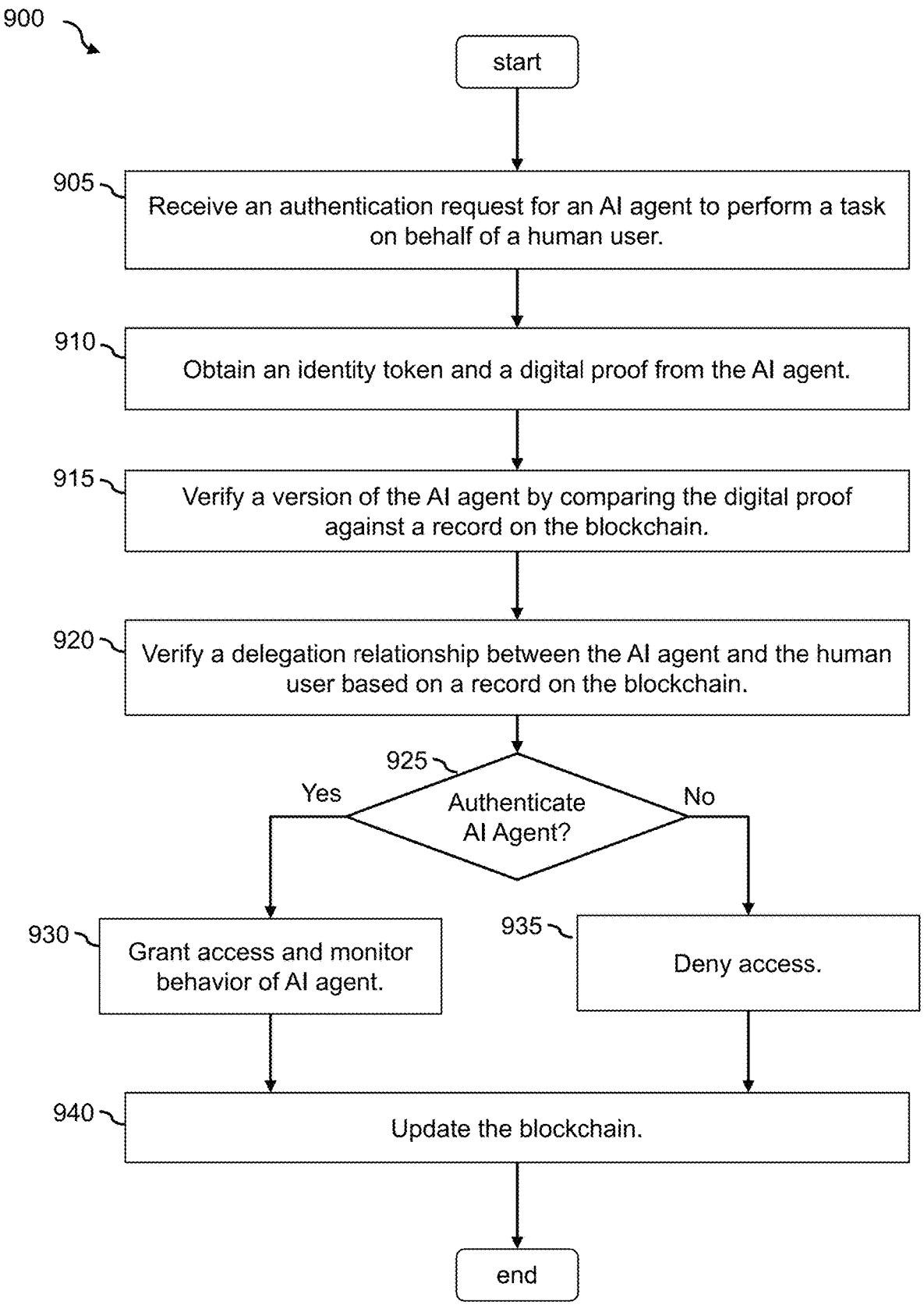
FIG. 9 illustrates a process of authenticating an AI agent according to an embodiment of the present disclosure.

FIG. 9 illustrates a process 900 for authenticating an AI agent according to various embodiments of the disclosure. In some embodiments, at least a portion of the process 900 may be performed by the authentication module 132, although one or more steps may be performed by one or more of the components/devices/modules/systems described herein. The process 800 begins by receiving (at step 905) an authentication request for an AI agent to perform a task on behalf of a human user. For example, when an AI agent (e.g., the AI agent 180, the AI agent, 190, etc.) requests to access one or more resources from a data server (e.g., the data server). The submission of the request may trigger an automatic execution of the blockchain-based authentication process, which can be performed by the authentication module 132 or a device executing a smart contract associated with the blockchain 150.

As part of the authentication process, the authentication module 132 or the device executing the smart contract may obtain (at step 910) an identity token and a digital proof from the AI agent. The authentication module 132 or the device executing the smart contract may traverse the blockchain 150 to retrieve one or more records associated with the AI agent based on the identity token. The one or more records may include attributes associated with the AI agent that is linked to the identity token when the AI agent registered with the authentication module 132. For example, the one or more records may include the model name, the version number, a hash of the binary code of the AI agent when the AI agent registered with the authentication module 132, a delegation relationship associated with the AI agent, etc. The authentication module 132 or the device executing the smart contract verifies (at step 915) a version of the AI agent by comparing the digital proof (e.g., a hash of the current binary code of the AI agent) against the hash value stored in the one or more records on the blockchain 150. The authentication module 132 or the device executing the smart contract also verifies (at step 920) a delegation relationship between the AI agent and the human user based on a record on the blockchain. For example, the authentication module 132 or the device executing the smart contract determines whether the human user for whom the AI agent is performing the task, has an existing (registered) relationship with the AI agent based on the one or more records on the blockchain 150.

The authentication module 132 or the device executing the smart contract then determines (at step 925) whether to authenticate the AI agent based on the information obtained from the AI agent and the one or more records on the blockchain 150. For example, the authentication module 132 or the device executing the smart contract may authenticate the AI agent if it is verified that the binary code of the AI agent has not been modified since the last time the AI agent was authenticated based on comparing the digital proof against the hash value stored on a record of the blockchain 150, and that the AI agent has a registered delegation relationship with the human user. The authentication module 132 or the device executing the smart contract then grants access and monitors (at step 930) behavior of the AI agent. For example, the authentication module 132 or the device executing the smart contract may transmit an authentication signal to the data server, such that the data server may grant the AI agent access to the one or more resources. The authentication module 132 or the device executing the smart contract may also monitor the AI agent's performance of the task (e.g., which specific resources the AI agent has accessed, what task the AI agent has performed, what output the AI agent has generated, etc.). The authentication module 132 or the device executing the smart contract may determine if the behavior of the AI agent is consistent with the behavior profile associated with the AI agent, and may adjust the trust score based on whether the behavior of the AI agent deviates from the norm specified in the behavior profile.

On the other hand, if it is determined that the binary code of the AI agent has been modified since the last time the AI agent was authenticated based on comparing the digital proof against the hash value stored on a record of the blockchain 150, or that the AI agent has a registered delegation relationship with the human user, the authentication module 132 or the device executing the smart contract may not authenticate the AI agent. The authentication module 132 or the device executing the smart contract may then deny (at step 935) the AI agent's access to the one or more resources. The authentication module 132 or the device executing the smart contract then updates (at step 940) the blockchain based on the authentication result.

Figure 10:
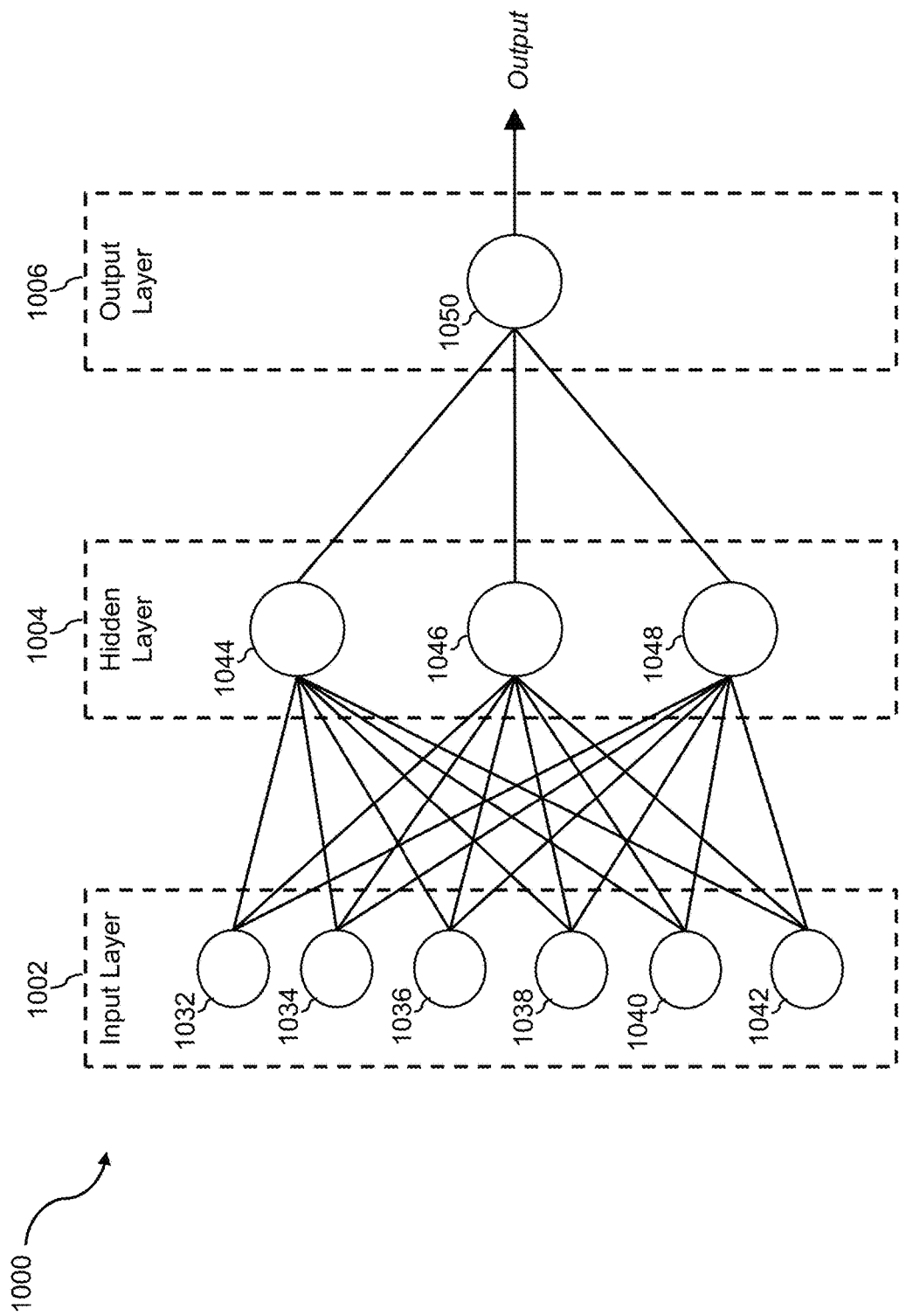
FIG. 10 illustrates an example neural network that can be used to implement a machine learning model according to an embodiment of the present disclosure.

FIG. 10 illustrates an example artificial neural network 1000 that may be used to implement a machine learning model, such as the AI agent 180, the AI agent 190, the AI agent 752, the AI agent 754, and the AI models 712, 714, 716, and 718. As shown, the artificial neural network 1000 includes three layers—an input layer 1002, a hidden layer 1004, and an output layer 1006. Each of the layers 1002, 1004, and 1006 may include one or more nodes (also referred to as "neurons"). For example, the input layer 1002 includes nodes 1032, 1034, 1036, 1038, 1040, and 1042, the hidden layer 1004 includes nodes 1044, 1046, and 1048, and the output layer 1006 includes a node 1050. In this example, each node in a layer is connected to every node in an adjacent layer via edges and an adjustable weight is often associated with each edge. For example, the node 1032 in the input layer 1002 is connected to all of the nodes 1044, 1046, and 1048 in the hidden layer 1004. Similarly, the node 1044 in the hidden layer is connected to all of the nodes 1032, 1034, 1036, 1038, 1040, and 1042 in the input layer 1002 and the node 1050 in the output layer 1006. While each node in each layer in this example is fully connected to the nodes in the adjacent layer(s) for illustrative purpose only, it has been contemplated that the nodes in different layers can be connected according to any other neural network topologies as needed for the purpose of performing a corresponding task.

The hidden layer 1004 is an intermediate layer between the input layer 1002 and the output layer 1006 of the artificial neural network 1000. Although only one hidden layer is shown for the artificial neural network 1000 for illustrative purpose only, it has been contemplated that the artificial neural network 1000 used to implement any one of the computer-based models may include as many hidden layers as necessary. The hidden layer 1004 is configured to extract and transform the input data received from the input layer 1002 through a series of weighted computations and activation functions.

In this example, the artificial neural network 1000 receives a set of inputs and produces an output. Each node in the input layer 1002 may correspond to a distinct input. For example, when the artificial neural network 1000 is used to implement an AI agent, the nodes in the input layer 1002 may correspond to different attributes of a prompt.

In some embodiments, each of the nodes 1044, 1046, and 1048 in the hidden layer 1004 generates a representation, which may include a mathematical computation (or algorithm) that produces a value based on the input values received from the nodes 1032, 1034, 1036, 1038, 1040, and 1042. The mathematical computation may include assigning different weights (e.g., node weights, edge weights, etc.) to each of the data values received from the nodes 1032, 1034, 1036, 1038, 1040, and 1042, performing a weighted sum of the inputs according to the weights assigned to each connection (e.g., each edge), and then applying an activation function associated with the respective node (or neuron) to the result. The nodes 1044, 1046, and 1048 may include different algorithms (e.g., different activation functions) and/or different weights assigned to the data variables from the nodes 1032, 1034, 1036, 1038, 1040, and 1042 such that each of the nodes 1044, 1046, and 1048 may produce a different value based on the same input values received from the nodes 1032, 1034, 1036, 1038, 1040, and 1042. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 1002 is transformed into rather different values indicative data characteristics corresponding to a task that the artificial neural network 1000 has been designed to perform.

In some embodiments, the weights that are initially assigned to the input values for each of the nodes 1044, 1046, and 1048 may be randomly generated (e.g., using a computer randomizer). The values generated by the nodes 1044, 1046, and 1048 may be used by the node 1050 in the output layer 1006 to produce an output value (e.g., a response to a user query, a prediction, etc.) for the artificial neural network 1000. The number of nodes in the output layer depends on the nature of the task being addressed. For example, in a binary classification problem, the output layer may consist of a single node representing the probability of belonging to one class (as in the example shown in FIG. 10). In a multi-class classification problem, the output layer may have multiple nodes, each representing the probability of belonging to a specific class. When the artificial neural network 1000 is used to implement an AI agent, the output node 950 may be configured to generate content (e.g., a prediction of a medical diagnosis, a determination of a computer network issue, etc.).

In some embodiments, the artificial neural network 1000 may be implemented on one or more hardware processors, such as CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware used to implement the neural network structure is specifically configured based on factors such as the complexity of the neural network, the scale of the tasks (e.g., training time, input data scale, size of training dataset, etc.), and the desired performance.

The artificial neural network 1000 may be trained by using training data based on one or more loss functions and one or more hyperparameters. By using the training data to iteratively train the artificial neural network 1000 through a feedback mechanism (e.g., comparing an output from the artificial neural network 1000 against an expected output, which is also known as the "ground-truth" or "label"), the parameters (e.g., the weights, bias parameters, coefficients in the activation functions, etc.) of the artificial neural network 1000 may be adjusted to achieve an objective according to the one or more loss functions and based on the one or more hyperparameters such that an optimal output is produced in the output layer 1006 to minimize the loss in the loss functions. Given the loss, the negative gradient of the loss function is computed with respect to each weight of each layer individually. Such negative gradient is computed one layer at a time, iteratively backward from the last layer (e.g., the output layer 1006 to the input layer 1002 of the artificial neural network 1000). These gradients quantify the sensitivity of the network's output to changes in the parameters. The chain rule of calculus is applied to efficiently calculate these gradients by propagating the gradients backward from the output layer 1006 to the input layer 902.

Parameters of the artificial neural network 1000 are updated backwardly from the last layer to the input layer (backpropagating) based on the computed negative gradient using an optimization algorithm to minimize the loss. The backpropagation from the last layer (e.g., the output layer 1006) to the input layer 1002 may be conducted for a number of training samples in a number of iterative training epochs. In this way, parameters of the artificial neural network 1000 may be gradually updated in a direction to result in a lesser or minimized loss, indicating the artificial neural network 1000 has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as to predict a frequency of future related transactions.

Figure 11:
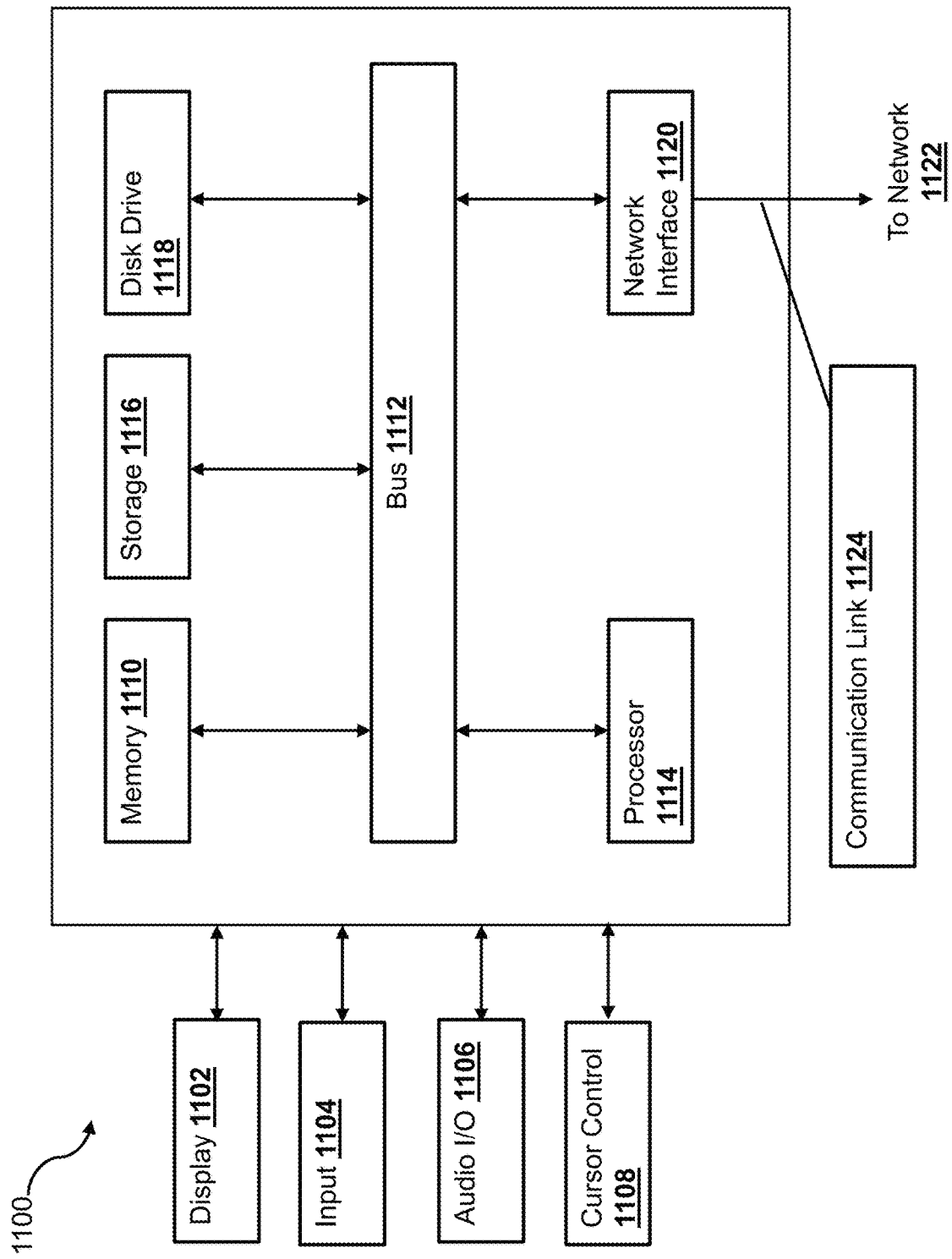
FIG. 11 is a block diagram of a system for implementing a device according to an embodiment of the present disclosure.

FIG. 11 is a block diagram of a computer system 1100 suitable for implementing one or more embodiments of the present disclosure, including the service provider server 130, the data servers 120 and 170, the devices that execute the AI agents 180, 190, 752, and 754, the devices that execute the AI models 712, 714, 716, and 718, and the user device 110. In various implementations, each of the device 110 may include a mobile cellular phone, a tablet, personal computer (PC), laptop, wearable computing device, etc. adapted for wireless communication, and each of the service provider server 130, the data servers 120 and 170, the devices that execute the AI agents 180, 190, 752, and 754, and the devices that execute the AI models 712, 714, 716, and 718, may include a network computing device, such as a server. Thus, it should be appreciated that the devices/servers 110, 120, 130, 170, and other devices may be implemented as the computer system 1100 in a manner as follows.

The computer system 1100 includes a bus 1112 or other communication mechanism for communicating information data, signals, and information between various components of the computer system 1100. The components include an input/output (I/O) component 1104 that processes a user (i.e., sender, recipient, service provider) action, such as selecting keys from a keypad/keyboard, selecting one or more buttons or links, etc., and sends a corresponding signal to the bus 1112. The I/O component 1104 may also include an output component, such as a display 1102 and a cursor control 1108 (such as a keyboard, keypad, mouse, etc.). The display 1102 may be configured to present a login page for logging into a user account or a checkout page for purchasing an item from a merchant. An optional audio input/output component 1106 may also be included to allow a user to use voice for inputting information by converting audio signals.

The audio I/O component 1106 may allow the user to hear audio. A transceiver or network interface 1120 transmits and receives signals between the computer system 1100 and other devices, such as another user device, a merchant server, or a service provider server via a network 1122, such as network 160 of FIG. 1. In one embodiment, the transmission is wireless, although other transmission mediums and methods may also be suitable. A processor 1114, which can be a micro-controller, digital signal processor (DSP), or other processing component, processes these various signals, such as for display on the computer system 1100 or transmission to other devices via a communication link 1124. The processor 1114 may also control transmission of information, such as cookies or IP addresses, to other devices.

The components of the computer system 1100 also include a system memory component 1110 (e.g., RAM), a static storage component 1116 (e.g., ROM), and/or a disk drive 1118 (e.g., a solid-state drive, a hard drive). The computer system 1100 performs specific operations by the processor 1114 and other components by executing one or more sequences of instructions contained in the system memory component 1110. For example, the processor 1114 can perform the cryptocurrency transactions functionalities described herein.

Logic may be encoded in a computer readable medium, which may refer to any medium that participates in providing instructions to the processor 1114 for execution. Such a medium may take many forms, including but not limited to, non-volatile media, volatile media, and transmission media. In various implementations, non-volatile media includes optical or magnetic disks, volatile media includes dynamic memory, such as the system memory component 1110, and transmission media includes coaxial cables, copper wire, and fiber optics, including wires that comprise the bus 1112. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 1100. In various other embodiments of the present disclosure, a plurality of computer systems 1100 coupled by the communication link 1124 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
    a non-transitory memory; and
    one or more hardware processors coupled with the non-transitory memory and configured to read instructions from the non-transitory memory to cause the system to perform operations comprising:
        receiving, from an artificial intelligence (AI) agent during a first chat session, a request for performing a first task using a first AI model from a plurality of AI models;
        accessing, from a blockchain and using an agent identity token associated with the AI agent, permission data associated with the AI agent;
        determining that the first task is associated with a particular domain;
        retrieving, from the blockchain and based on the permission data associated with the AI agent and the particular domain, contextual information related to the first task, wherein the contextual information comprises an output generated by a second AI model from the plurality of AI models for performing a second task during a second chat session prior to the first chat session;
        instructing the first AI model to perform the first task using the contextual information;
        providing, in the first chat session, content based on a response generated by the first AI model; and
        modifying the contextual information based on adding the response to the contextual information, wherein the agent identity token is attached to the response.

2. The system of claim 1, wherein the second task was performed by the second AI model in response to a second request submitted by a second AI agent.

3. The system of claim 2, wherein the first chat session is conducted via a first chat platform, and wherein the second chat session was conducted via a second chat platform.

4. The system of claim 1, wherein the operations further comprise:
  determining that the AI agent has permission to access the contextual information based on the permission data.

5. The system of claim 1, wherein the modifying is further based on the permission data associated with the AI agent.

6. The system of claim 1, wherein the operations further comprise:
  adding the modified contextual information to the blockchain.

7. The system of claim 1, wherein the operations further comprise:
  facilitating the first chat session among a plurality of users via chat interfaces provided on a plurality of devices corresponding to the plurality of users.

8. The system of claim 1, wherein the request comprises a prompt for the first AI model, and wherein the operations further comprise:
  generating a summary for the contextual information;
  modifying the prompt by inserting the summary into the prompt; and
  providing the modified prompt to the first AI model.

9. The system of claim 1, wherein the operations further comprise:
  modifying the response based on the permission data associated with the AI agent, wherein the content provided in the first chat session comprises the modified response.

10. The system of claim 1, wherein the operations further comprise:
  authenticating the AI agent based on verification data retrieved from the blockchain using the agent identity token associated with the AI agent.

11. A method comprising:
  receiving, by a computer system and from an artificial intelligence (AI) agent during a first chat session, a request for performing a first task using a first AI model from a plurality of AI models;
  accessing, by the computer system and using an agent identity token associated with the AI agent, permission data associated with the AI agent from a blockchain;
  determining, by the computer system, that the first task is associated with a particular domain;
  retrieving, by the computer system and from the blockchain, contextual information related to the first task based on the permission data associated with the AI agent and the particular domain, wherein the contextual information comprises an output generated by a second AI model from the plurality of AI models for performing a second task during a second chat session prior to the first chat session;
  instructing, by the computer system, the first AI model to perform the first task using the contextual information;
  providing, by the computer system and in the first chat session, content based on a response generated by the first AI model; and
  modifying, by the computer system, the contextual information based on adding the response to the contextual information, wherein the agent identity token is attached to the response.

12. The method of claim 11, wherein the second task was performed by the second AI model in response to a second request submitted by a second AI agent.

13. The method of claim 12, wherein the first chat session is conducted via a first chat platform, and wherein the second chat session was conducted via a second chat platform different from the first chat platform.

14. The method of claim 11, further comprising:
  determining that the AI agent has permission to access the contextual information based on the permission data.

15. The method of claim 11, wherein the modifying is further based on the permission data associated with the AI agent.

16. The method of claim 11, further comprising:
  adding the modified contextual information to the blockchain.

17. The method of claim 11, further comprising:
  facilitating the first chat session among a plurality of users via chat interfaces provided on a plurality of devices corresponding to the plurality of users.

18. The method of claim 11, wherein the request comprises a prompt for the first AI model, and wherein the method further comprises:
  generating a summary for the contextual information;
  modifying the prompt by inserting the summary into the prompt; and
  providing the modified prompt to the first AI model.

19. The method of claim 11, further comprising:
  modifying the response based on the permission data associated with the AI agent, wherein the content provided in the first chat session comprises the modified response.

20. The method of claim 11, further comprising:
  authenticating the AI agent based on verification data retrieved from the blockchain using the agent identity token associated with the AI agent.

* * * * *

UNITED STATES PATENT AND TRADEMARK OFFICE
CERTIFICATE OF CORRECTION

PATENT NO. : 12,483,411 B1
APPLICATION NO. : 19/231175
DATED : November 25, 2025
INVENTOR(S) : Thomas Chen Page 1 of 1

It is certified that error appears in the above-identified patent and that said Letters Patent is hereby corrected as shown below:

In the Specification

Column 7, Line 34, change "service such as CLEAR®, OKTAR, IDV®," to -- service such as CLEAR®, OKTA®, IDV®, --

Column 21, Line 26, change "party platform such as CLEAR®, OKTAR, IDVR," to -- party platform such as CLEAR®, OKTA®, IDV®, --

Signed and Sealed this
Thirtieth Day of December, 2025

John A. Squires
*Director of the United States Patent and Trademark Office*